(12) United States Patent
Madine et al.

(10) Patent No.: US 9,955,307 B1
(45) Date of Patent: Apr. 24, 2018

(54) DISTRIBUTED RELATIVE POSITIONING

(71) Applicant: HERE Global B.V., Eindhoven (NL)

(72) Inventors: Simon Madine, Edinburgh (GB);
Massimiliano Marcon, Berlin (DE)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/668,397

(22) Filed: Aug. 3, 2017

(51) Int. Cl.
*H04W 24/00* (2009.01)
*H04W 4/02* (2018.01)

(52) U.S. Cl.
CPC ........... *H04W 4/023* (2013.01); *H04W 4/026* (2013.01); *H04W 4/027* (2013.01)

(58) Field of Classification Search
CPC ...... H04W 4/023; H04W 4/026; H04W 4/027
See application file for complete search history.

(56) References Cited

U.S. PATENT DOCUMENTS

| | | | | |
|---|---|---|---|---|
| 9,763,043 | B2* | 9/2017 | Larsen | H04W 4/023 |
| 2010/0091924 | A1* | 4/2010 | Wu | G01S 5/0221 |
| | | | | 375/355 |
| 2011/0183683 | A1* | 7/2011 | Das | H04W 60/00 |
| | | | | 455/456.1 |
| 2015/0245182 | A1* | 8/2015 | Scagnol | H04L 43/065 |
| | | | | 370/312 |
| 2016/0018508 | A1* | 1/2016 | Chen | G01S 5/0252 |
| | | | | 455/456.1 |
| 2016/0037330 | A1* | 2/2016 | Ponnuswamy | H04W 8/186 |
| | | | | 370/328 |
| 2016/0088424 | A1* | 3/2016 | Polo | H04W 4/008 |
| | | | | 455/41.1 |
| 2016/0112839 | A1* | 4/2016 | Choi | H04W 4/023 |
| | | | | 455/41.2 |
| 2016/0234634 | A1* | 8/2016 | Rasband | H04W 4/02 |
| 2016/0330584 | A1* | 11/2016 | Akpinar | G01S 5/02 |
| 2017/0142542 | A1* | 5/2017 | Chiu | H04W 4/008 |

\* cited by examiner

*Primary Examiner* — Ajit Patel
(74) *Attorney, Agent, or Firm* — Alston & Bird LLP

(57) ABSTRACT

A method is disclosed for relative positioning performed by a first mobile device that is one of a plurality of mobile devices. The method determines a first probe signal parameter that is indicative for a distance between the first mobile device and a second mobile device. The method obtains one or more further probe signal parameters. Each further probe signal parameter is indicative for a distance between two of the plurality of mobile devices. The method selects probe signal parameters of the first probe signal parameter and the further probe signal parameters for determining one or more relative positions between two or more of the plurality of mobile devices. The method determines one or more relative positions between two or more of the plurality of mobile devices at least based on the selected probe signal parameters. A corresponding apparatus, system and computer readable medium are also disclosed.

26 Claims, 10 Drawing Sheets

| Identifier of receiving mobile device | Identifier of transmitting mobile device | Received signal strength parameter value | Time stamp parameter value | Motion activity parameter value |
|---|---|---|---|---|
| MOBILE_DEVICE_101_ID | MOBILE_DEVICE_102_ID | -70 | 1490100580614 | 0.8 |
| MOBILE_DEVICE_101_ID | MOBILE_DEVICE_103_ID | -80 | 1490100580712 | 1.0 |
| MOBILE_DEVICE_101_ID | MOBILE_DEVICE_104_ID | -92 | 1490100580924 | 1.5 |

Fig.4a

| Identifier of receiving mobile device | Identifier of transmitting mobile device | Received signal strength parameter value | Time stamp parameter value | Motion activity parameter value |
|---|---|---|---|---|
| 401  MOBILE_DEVICE_101_ID | MOBILE_DEVICE_102_ID | -70 | 1490100580614 | 0.8 |
| 402  MOBILE_DEVICE_101_ID | MOBILE_DEVICE_103_ID | -80 | 1490100580712 | 1.0 |
| 403  MOBILE_DEVICE_101_ID | MOBILE_DEVICE_104_ID | -92 | 1490100580924 | 1.5 |
| 404  MOBILE_DEVICE_102_ID | MOBILE_DEVICE_101_ID | -72 | 1490100580214 | 0.7 |
| 405  MOBILE_DEVICE_102_ID | MOBILE_DEVICE_103_ID | -75 | 1490100580628 | 1.0 |
| 406  MOBILE_DEVICE_102_ID | MOBILE_DEVICE_104_ID | -95 | 1490100584865 | 1.5 |
| 407  MOBILE_DEVICE_104_ID | MOBILE_DEVICE_101_ID | -92 | 1490100590614 | 0.7 |
| 408  MOBILE_DEVICE_104_ID | MOBILE_DEVICE_102_ID | -100 | 1490100580614 | 0.8 |
| 409  MOBILE_DEVICE_104_ID | MOBILE_DEVICE_103_ID | -40 | 1490100582616 | 1.0 |

Fig.4b

DISTRIBUTED RELATIVE POSITIONING

FIELD OF THE DISCLOSURE

The invention relates to the field of distributed relative positioning and more specifically to distributed relative positioning of mobile devices.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS) or Beidou or Galileo, do not penetrate through walls and roofs strongly enough for an adequate signal reception indoors. Thus, these positioning technologies are not able to deliver a performance indoors that would enable seamless, equal and accurate positioning outdoors and indoors.

Therefore, several dedicated solutions for indoor positioning have been developed and commercially deployed during the past years. Examples comprise solutions that are based on pseudolites, which are ground based GPS-like short-range beacons, ultra-sound positioning solutions, Bluetooth low energy (BLE) based positioning solutions, cellular network based positioning solutions and wireless local area network (WLAN) based positioning solutions.

A WLAN based positioning solution, for instance, may be divided in two stages, a training stage and a positioning stage. In the training stage, learning data is collected. The data may be collected in the form of fingerprints that are based on measurements by mobile devices. A fingerprint may contain a location estimate and measurements taken from a radio interface. The location estimate may be for example GNSS based, sensor-based, or manually inputted. Results of measurements taken from the radio interface may comprise, by way of example, measured radio signal strengths and an identification of WLAN access points transmitting the radio signals. Collected fingerprint data may be uploaded to a central positioning database in a server or in the cloud, where algorithms may be run to generate radio models of WLAN access points and/or radio maps for positioning purposes. In the positioning stage, the current location of a mobile device may be estimated based on measurements of the mobile device taken from the radio interface and on the data or a subset of data that is available from the training stage.

A similar approach could be used for a positioning that is based on other types of terrestrial transmitters or on a combination of different types of terrestrial transmitters.

A model or radio map based positioning may function either in mobile-based or mobile-assisted mode, the difference being in where the position estimate is calculated. For the mobile-based approach, model data or radio map data that has been generated in the training stage may be transferred to mobile devices by a server as assistance data for use in position determinations. This may be useful for instance for mobile phones, where primarily the mobile device's user is interested in location information. The mobile-assisted mode, in contrast, refers to the case in which the device only makes the appropriate measurements, for e.g. signal strength measurements, and sends the measurement results to another entity, e.g. a server, for position estimation.

Accordingly, these indoor positioning solutions require a central positioning infrastructure for generating the model data or radio map data in the training stage.

SUMMARY OF SOME EMBODIMENTS

According to an exemplary aspect of the invention, a method for relative positioning performed by a first mobile device is disclosed, wherein the first mobile device is part of a plurality of mobile devices, wherein the method comprises:
  determining a first probe signal parameter that is indicative for a distance between said first mobile device and a second mobile device of said plurality of devices;
  obtaining one or more further probe signal parameters, wherein each of said one or more further probe signal parameters is indicative for a distance between two mobile devices of said plurality of mobile devices;
  selecting probe signal parameters of said first probe signal parameter and said further probe signal parameters for determining one or more relative positions between two or more mobile devices of said plurality of mobile devices;
  determining one or more relative positions between two or more mobile devices of said plurality of mobile devices at least based on said selected probe signal parameters of said first probe signal parameter and said one or more further probe signal parameters.

A probe signal parameter may be understood to represent a value of a physical quantity of a probe signal or associated with the probe signal. Therein, a probe signal is a radio signal, for example a Bluetooth signal, or a Bluetooth Low Energy (BLE) signal or Wireless Local Area Network (WLAN) signal. The Bluetooth standards are specified by the Bluetooth Special Interest Group and are presently available under https://www.bluetooth.com/. WLAN is for example specified by the standards of the IEEE 802.11 family (http://www.ieee.org/). For example, each mobile device of the plurality of mobile devices periodically transmits (e.g. broadcasts) a respective probe signal or is configured to periodically transmit (e.g. broadcast) a respective probe signal. Each mobile device of the plurality of mobile devices may scan for probe signals (e.g. periodically transmitted probe signals).

A probe signal parameter may be understood to be indicative for a distance between two mobile devices of the plurality of devices if the probe signal parameter represents a value of a physical quantity of a probe signal or associated with the probe signal that depends on the distance between these two mobile devices. For example, the first probe signal parameter may represent a value of a physical quantity of a first probe signal or associated with the first probe signal that depends on the distance between the first mobile device and the second mobile device. Such a physical quantity of the probe signal or associated with the probe signal may be a quantity depending on the radio path-loss, or radio propagation velocity, or a combination thereof along a radio transmission path between the two mobile devices. Examples of such a quantity are receptions parameters like a received signal strength and transmission parameters like a round trip time. For example, the probe signal may be transmitted by one of these mobile devices and received by the other one of these mobile devices.

Accordingly, determining a probe signal parameter may comprise determining a value of a physical quantity of the probe signal or associated with the probe signal. For example, the value of the physical quantity of the probe signal or associated with the probe signal may be determined (e.g. calculated or measured) by a mobile device (e.g. by a communication interface of a mobile device) receiving or transmitting the probe signal. Alternatively or additionally, determining a probe signal parameter may comprise extracting the probe signal parameter or a physical quantity of the probe signal or associated with the probe signal from the probe signal. For example, the first probe signal parameter may be extracted from the first probe signal received by the first mobile device.

Obtaining one or more further probe signal parameters by a mobile device may be understood to mean that one or more one or more reports messages at least partially containing the one or more further probe signals are received by the mobile device (e.g. by a radio communication interface of the mobile device). Alternatively or additionally, the one or more further probe signals may be at least partially obtained by determining the one or more further probe signal parameters by the mobile device. For example, the one or more further probe signal parameters may be at least partially determined by the first mobile device in a manner similar to the first probe signal parameter.

As a result of the selecting probe signal parameters of said first probe signal parameter and said further probe signal parameters selected probe signal parameters (e.g. more than one, e.g. a plurality of selected probe signal parameters) may be obtained. The selected probe signal parameters may comprise all or a part of said first probe signal parameter and said further probe signal parameters.

The selecting may be performed according to a (e.g. predetermined) selection algorithm, wherein the selection algorithm may be configured to select probe signal parameters which are suited for determining one or more relative positions between two or more mobile devices of the plurality of mobile devices. As disclosed below, the selecting may for example serve for avoiding that colliding probe signal parameters are used for determining one or more relative positions between two or more mobile devices of the plurality of mobile devices.

The selected probe signal parameters may then be used for determining one or more relative positions between two or more mobile devices of the plurality of mobile devices. That the determining one or more relative positions between two or more mobile devices of the plurality of mobile devices is based on the selected probe signal parameters of said first probe signal parameter and said one or more further probe signal parameters may be understood to mean that only said selected probe signal parameters are used for determining one or more relative positions between two or more mobile devices of said plurality of mobile devices.

The determining one or more relative positions between two or more mobile devices of the plurality of mobile devices may be performed according to a (e.g. predetermined) trilateration algorithm. For example, the selected probe signal parameters may be input parameters of the trilateration algorithm. The trilateration algorithm may be a deterministic algorithm which is used by each mobile device of the plurality of mobile devices.

The probe signal parameters (i.e. the first probe signal parameter and the further probe signal parameters) that are indicative for a distance between two mobile devices of the plurality of mobile devices may be used as representation of the distances between the mobile devices by the trilateration algorithm.

For determining one or more relative positions between two or more mobile devices of the plurality of mobile devices (e.g. for the trilateration algorithm), it may be assumed that the mobile devices are in the same plane. For example, in certain situations (e.g. when the mobile devices are expected to be on the same floor of a building or on ground surface) this may allow to simplify determining the relative positions wherein only minor and acceptable inaccuracies are introduced. In other situations (e.g. when the mobile devices are expected to be on different floors of a building), this assumption may however not be used. For example, user input of a user indicating whether this assumption is to be used for determining one or more relative positions may be captured (e.g. by user input means like a user interface of the first mobile device). Alternatively, it may be determined based on altitude parameters that are indicative for the altitude of the mobile devices of the plurality of mobile devices whether mobile devices are in the same plane.

A relative position between two or more mobile devices may be understood to represent the positions of these two or more mobile devices relatively to each other. In other words, a relative position between two or more mobile devices may represent a relative direction (e.g. a relative angle) and a relative distance between the two or more mobile devices. If it is to be assumed that the mobile devices are in the same plane, a relative position between two or more mobile devices may be understood to represent the positions of these two or more mobile devices relatively to each other and in this plane.

As a result of the determining one or more relative positions between two or more mobile devices of the plurality of mobile devices, a weighted graph or a representation of a weighted graph may be obtained. Each node of the weighted graph may represent a mobile device of the plurality of mobile devices. Each edge of the graph may be assigned a weight that is associated with a probe signal parameter that is indicative for a distance between two mobile devices of the plurality of mobile devices. Furthermore, each edge of the graph may represent a relative direction between two mobile devices of the plurality of mobile devices (e.g. a relative angle between two mobile devices of the plurality of mobile devices). If it is assumed for determining one or more relative positions that the mobile devices are in the same plane, the weighted graph may be two-dimensional (e.g. such that the edges and nodes of the weighted graph are in the same plane). Otherwise, the weighted graph may be three-dimensional (e.g. such that the edges and nodes of the weighted graph are not in the same plane).

As an example, a two-dimensional graph may for example be represented by polar coordinates (i.e. radial distance and polar angle) of the nodes of the weighted according to a defined polar coordinate system and a three-dimensional graph may for example be represented by spherical coordinates (i.e. radial distance, polar angle and azimuth angle) of the nodes of the weighted graph according to a defined spherical coordinate system. The orientation of such a coordinate systems may for example be defined such that the node representing the first mobile device is treated as the origin of the coordinate system and the node representing the mobile device for which the first mobile device has firstly determined a relative position (e.g. the second mobile device) is on the x-axis of the coordinate system. Accordingly, a representation of such a graph may be a table, where each row contains such coordinates of a node of the graph. Furthermore, the table may contain information representing which nodes are connected by an edge.

According to a further exemplary aspect of the invention, an apparatus is disclosed, wherein the apparatus is or is part of a first mobile device, the apparatus comprising means for performing the steps of any one embodiment of the disclosed method, when the first mobile device is part of a plurality of mobile devices.

The means of the disclosed apparatus can be implemented in hardware and/or software. They may comprise for instance a processor for executing computer program code for realizing the required functions, a memory storing the program code, or both. Alternatively, they could comprise for instance circuitry that is designed to realize the required functions, for instance implemented in a chipset or a chip, like an integrated circuit. The disclosed apparatus may comprise a single means for all functions, a common plurality of means for all functions, or a plurality of different means for different functions.

According to a further exemplary aspect of the invention, an apparatus is disclosed, wherein the apparatus is or is part of a first mobile device, the apparatus comprising at least one processor and at least one memory including computer program code, the at least one memory and the computer program code with the at least one processor configured to cause the apparatus at least to perform, when the first mobile device is part of a plurality of mobile devices, the steps of any one embodiment of the disclosed method.

For example, the disclosed apparatus(es) may be modules or components for a mobile device, for example chips. Alternatively, the disclosed apparatus(es) may be mobile devices. The disclosed apparatus(es) may comprise only the disclosed components (e.g. means) or may further comprise one or more additional components.

According to a further exemplary aspect of the invention, a system is disclosed which comprises a plurality of mobile devices, wherein at least a first mobile device of the plurality of mobile devices comprises at least one processor and at least one memory including computer program code for one or more programs, the at least one memory and the computer program code configured to, with the at least one processor, cause the first mobile device to perform the steps of any one embodiment of the disclosed method.

According to a further exemplary aspect of the invention, a non-transitory computer readable storage medium is disclosed, in which computer program code is stored. The computer program code causes a first mobile device to perform, when the first mobile device is part of a plurality of mobile devices, the steps of any one embodiment of the disclosed method when executed by a processor. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

According to a further exemplary aspect of the invention, a computer program code is disclosed, the computer program code when executed by a processor causing a first mobile device to perform, when the first mobile device is part of a plurality of mobile devices, the steps of any one embodiment of the disclosed method.

The disclosed method, apparatus(es), system, non-transitory computer readable storage medium and computer program code may be for distributed relative positioning, for example for distributed relative positioning of mobile devices.

In the following, further features and embodiments of these exemplary aspects of the invention will be described.

According to an exemplary embodiment of the different aspects, the method further comprises:
receiving at least one first probe signal transmitted by the second mobile device, wherein said first probe signal parameter is determined based on said received at least one first probe signal.

Receiving a radio signal (e.g. a probe signal) by a mobile device may be understood to mean that the radio signal is detected, or converted, or demodulated, or decoded, or a combination thereof by the mobile device (e.g. by a radio communication interface of the mobile device).

For example, the first probe signal may be a probe signal that is periodically transmitted (e.g. broadcasted) by the second mobile device (e.g. by a radio communication interface of the second mobile device). For example, the first probe signal may be received (e.g. at least detected) by the first mobile device (e.g. by a radio communication interface of the first mobile device) when the first mobile device is scanning for probe signals.

Determining a probe signal parameter based on a received probe signal may be understood to mean that the probe signal parameter represents a quantity of the probe signal or associated with the probe signal that is determined (e.g. measured or calculated) when the probe signal is received (e.g. detected).

According to an exemplary embodiment of the different aspects, if said first probe signal parameter and said one or more further probe signal parameter contain colliding probe signal parameters that are indicative for a distance between two mobile devices (e.g. the same two mobile devices) of said plurality of mobile devices, the selecting comprises:
selecting one of said colliding probe signal parameters for determining a relative position between said two mobile devices at least based on a motion activity parameter that is associated with a motion activity of one of said two mobile devices, or a time stamp parameter that is associated with one of said colliding probe signal parameters, or a combination thereof.

Furthermore, the selecting may comprise:
selecting all non-colliding probe signal parameters of said first probe signal parameter and said one or more further probe signal parameter.

Two or more probe signal parameters of the first probe signal parameter and the one or more further probe signal parameter may be understood to be colliding probe signal parameters (i.e. to form a set of colliding probe signal parameters) if they are indicative for a distance between the same two mobile devices of said plurality of mobile devices and if they are different (e.g. represent different values). The selecting one of said colliding probe signal parameters may be performed separately (e.g. repeated) for each set of colliding probe signal parameters.

For example, if the one or more further probe signal parameters contain at least one second probe signal parameter that is indicative for a distance between the first mobile device and the second mobile device and that is different from the first probe signal parameter, the first probe signal parameter and the at least one second probe signal parameter are colliding probe signal parameters.

A motion activity parameter that is associated with a motion activity of a mobile device may quantitatively or qualitatively represent a motion activity of the mobile device. Such a motion activity parameter may represent the motion activity of the mobile device during a predetermined period of time or at a predetermined point of time. To this end, the motion activity parameter that is associated with a motion activity of a mobile device may be determined (e.g.

calculated) based on a velocity of the mobile device, or an acceleration of the mobile device, or a development of a velocity of the mobile device, or a development of an acceleration of the mobile device, or a combination thereof. It may be considered as indication for mobility of the mobile device.

By way of example, a motion activity parameter that is associated with a motion activity of the mobile device may be determined for each probe signal parameter that is determined by the mobile device. For example, a motion activity parameter may represent a motion activity of the mobile device during a predetermined period of time prior to the determination of a probe signal parameter. Furthermore, the motion activity parameter may be determined based on a predetermined accuracy (e.g. in meters). The predetermined accuracy may depend on the type of deployment and may be rather low (e.g. 2 m) for applications where the mobile devices are rather static and may be rather high (e.g. 0.5 m) for applications where the mobile devices are rather mobile. As an example, the motion activity parameter (i.e. map) may be calculated for a predetermined period of time (i.e. $t_0$) as follows:

$$v_f = (t_0 * a) + v_i$$

$$d = v_f * t_0$$

$$map = d/A$$

with $v_f$=final velocity of mobile device in certain direction after $t_0$, a=acceleration in a certain direction during $t_0$, $v_i$=initial velocity of mobile device in certain direction before $t_0$, d=distance covered during $t_0$, A=predetermined accuracy. In this example, the motion activity parameter map is directly proportional to the distance d covered during $t_0$ and is greater than 1 if the distance d is greater than the predetermined accuracy A which may depend on the application. Accordingly, a higher motion activity parameter map indicates a higher motion activity of the mobile device during the predetermined period of time $t_0$. It is to be understood that the motion activity parameter map is only a non-limiting example.

Alternatively or additionally, the motion activity parameter may be determined based on different measurement values indicating an activity type a user of the mobile device is performing. Examples of such activity types are walking, running, climbing stairs, biking, swimming and/or driving. The different measurement values may be compared with and/or matched to given patterns (e.g. from previous measurements) associated with different activity types such as walking, running, climbing stairs, biking, swimming and/or driving. For example, the activity type may then be determined to correspond to the activity type associated with the best fitting pattern. The different measurement values may for example represent measurement values obtained by measurements of velocity, acceleration, vibration, position and/or user pulse. Subsequently, the motion activity parameter may be determined at least partially based on this activity type. As an example, if a walking pattern is detected for 10 seconds, there is a high probability that the user carrying the device has moved significantly. If the same pattern is detected for only one second, the position may have not changed significantly (and may for example be within an acceptable accuracy for the application and/or the error margin of the radio support positioning system, e.g. such small movements may be ignored).

As an example, a first motion activity parameter that is associated with a motion activity of the first mobile device may be determined (e.g. calculated) based on a velocity of the first mobile device, or an acceleration of the first mobile device, or a development of an velocity of the first mobile device, or a development of an acceleration of the first mobile device, or different measurement values indicating an activity type a user of the mobile device is performing, or a combination thereof. For example, the first motion activity parameter may represent a motion activity of the first mobile device (e.g. an average velocity or an average acceleration) during a predetermined period of time prior to the determination of the first probe signal parameter.

A time stamp parameter that is associated with a probe signal parameter may represent when the probe signal was received or when the probe signal parameter was determined (e.g. measured or calculated). To this end, a time stamp parameter may represent a date, or a time of day, or a combination thereof. For example, a time stamp parameter may represent a date and a time of day in unix time which means that a value represented by time stamp parameter corresponds to the number of seconds that have elapsed since 00:00:00 Coordinated Universal Time (UTC), Thursday, 1 Jan. 1970 minus the number of leap seconds that have taken place since then.

Such a time stamp parameter may be associated with each probe signal parameter of the first probe signal parameter and the one or more further probe signal parameters.

As an example, a first time stamp parameter that is associated with the first probe signal parameter may represent when the first probe signal was received by the first mobile device or when the first probe signal parameter was determined (e.g. collected or measured or calculated) by the first mobile device.

If colliding probe signal parameters would be used for determining a relative position between said two mobile devices, the relative position between said two mobile devices may be determined erroneously. This can be avoided by selecting one of said colliding probe signal parameters for determining a relative position between said two mobile devices. By using a motion activity parameter that is associated with a motion activity of one of said two mobile devices, or a time stamp parameter that is associated with one of said colliding probe signal parameters, or a combination thereof, the selecting may be performed in a deterministic way such that other mobile devices would select the same probe signal parameter in case of colliding probe signal parameters.

In certain exemplary embodiments, the selecting one of said colliding probe signal parameters comprises at least one of:

determining whether a difference between the time stamp parameters that are associated with said colliding probe signal parameters is greater than or equal to or less than a time threshold value;
  determining whether a value represented by one of said colliding probe signal parameters is greater than or equal to or less than a value represented by another one of said colliding probe signal parameters.

Therein, the time threshold value may be fixed and/or predetermined.

Alternatively, the time threshold value may be variable. This is for example advantageous to allow an adaptation of the time threshold value (and thus of the selecting) with respect to different applications. For example, freshness of the probe signal parameters used for determining the one or more relative positions may be less important in applications where the mobile devices are rather static, whereas freshness of the probe signal parameters may be more important in applications where the mobile devices are highly mobile. Accordingly, in applications where the mobile devices are rather static a greater time threshold value may be used than in applications where the mobile devices are highly mobile.

As disclosed above, the motion activity parameter associated with a mobile device may be considered as indication for mobility of the mobile device. Accordingly, the time threshold value may be determined (e.g. selected or calculated) at least based on a motion activity parameter that is indicative for a motion activity of one of said two mobile devices. Considering the exemplary motion activity parameter map which is disclosed above, the time threshold value (i.e. $t_{th}$) may be calculated based on this motion activity parameter map as follows:

$$t_{th}=t_0*\text{map}$$

with $t_0$=current or initial time threshold value prior to the calculation.

As disclosed above, a probe signal parameter may represent a value of a physical quantity of the probe signal based on which the respective probe signal parameter has been determined. Therein, the value of the physical quantity may depend on the distance between the two mobile devices for which the probe signal parameter is indicative. By considering the value represented by the colliding probe signal parameter for the selecting, it is thus possible to take a best case or a worst case scenario in terms of distance between the two mobile devices into account. For example, in certain applications a longer distance may be more favorable (or less favorable) than a shorter distance. Accordingly, in certain applications it may be more favorable to select the probe signal representing the value that is indicative of a longer distance, whereas in other applications it may be more favorable to select the probe signal representing the value that is indicative for a shorted distance.

Considering the above disclosed example that the first probe signal parameter and the at least one second probe signal parameter are colliding probe signal parameters, if a first motion activity parameter and/or a second motion activity parameter indicate that the first mobile device and/or the second mobile device have a low mobility (i.e. the motion activity is low), a greater time threshold value may be determined than in case the first motion activity parameter and/or the second motion activity parameter indicate that the first mobile device and/or the second mobile device have a high mobility (i.e. the motion activity is high). For example, if the absolute value of a difference of the first time stamp parameter and the second time stamp parameter is greater than the time threshold value, the newer (i.e. younger) one of the first probe signal parameter and the at least one second probe signal parameter may be selected. Otherwise, the one of the first probe signal parameter and the at least one second probe signal parameter is selected that represents the greater value or, if both represents the equal value, the first probe signal parameter (or alternatively the second probe signal parameter) is selected.

According to an exemplary embodiment of the different aspects, the method further comprises:

determining a first motion activity parameter that is associated with a motion activity of said first mobile device, or a first time stamp parameter that is associated with said first probe signal parameter, or a combination thereof; and obtaining one or more further motion activity parameters, or one or more further time stamp parameters, or a combination thereof.

As disclosed above, the first motion activity parameter that is associated with a motion activity of the first mobile device may be determined (e.g. calculated) based on a velocity of the first mobile device, or an acceleration of the first mobile device, or a development of an velocity of the first mobile device, or a development of an acceleration of the first mobile device, or a combination thereof. For example, the first motion activity parameter may represent a motion activity of the first mobile device (e.g. an average velocity or an average acceleration) during a predetermined period of time prior to the determination of the first probe signal parameter.

The first time stamp parameter that is associated with the first probe signal parameter may be determined to represent when the first probe signal was received by the first mobile device or when the first probe signal parameter was determined (e.g. collected or measured or calculated) by the first mobile device.

Obtaining one or more further motion activity parameters, or one or more further time stamp parameters, or a combination thereof by a mobile device may be understood to mean that one or more reports messages at least partially containing the one or more further motion activity parameters, or the one or more further time stamp parameters, or a combination thereof are received by the mobile device (e.g. by a radio communication interface of the mobile device). Alternatively or additionally, the one or more further probe signals may be at least partially obtained by determining the one or more further probe signal parameters by the mobile device. For example, the one or more further motion activity parameters, or the one or more further time stamp parameters, or a combination thereof may be at least partially contained in report messages received by the first mobile device and/or at least partially determined by the first mobile device in a manner similar to the first motion activity parameter, or the first time stamp parameter, or a combination thereof.

As disclosed above, the selected probe signal parameters of said first probe signal parameter and said one or more further probe signal parameters may be selected at least partially based on said first motion activity parameter, said first time stamp parameter, said one or more further motion activity parameters, and said one or more further time stamp parameters.

According to an exemplary embodiment of the different aspects, the determining one or more relative positions between two or more mobile devices of the plurality of mobile devices is further at least based on a first altitude parameter that is indicative for an altitude of the first mobile device and/or one or more further altitude parameters, wherein each of the one or more further altitude parameters is indicative for an altitude of a mobile device of said plurality of mobile devices.

Furthermore, the method may comprise obtaining the first altitude parameter and/or the one or more further altitude parameters.

An altitude parameter (e.g. the first altitude parameter) that is indicative for an altitude of a mobile device may for example be understood to represent the atmospheric pressure at the mobile device (e.g. the first mobile device) during a predetermined period of time or at a predetermined point of time. To this end, an altitude parameter may be determined to represent a value of an atmospheric pressure that is detectable at the mobile device during this predetermined period of time or at this predetermined point of time. Altitude parameters may for example be provided in hPa or refined to obtain an altitude in m.

For example, an altitude parameter that is indicative for an altitude of a mobile device may be obtained by detecting the atmospheric pressure at the first mobile device (e.g. by a pressure sensor such as a barometer of the mobile device). Alternatively or additionally, altitude parameter may be obtained by receiving a report message containing the altitude parameter (e.g. by a radio communication interface of the mobile device).

For example, the first altitude parameter may be obtained by detecting the atmospheric pressure at the first mobile device (e.g. by a pressure sensor such as a barometer of the first mobile device). Furthermore, the one or more further altitude parameters may be obtained by the first mobile device by receiving one or more reports messages at least partially containing the one or more further altitude parameters (e.g. by a radio communication interface of the first mobile device).

Mobile devices which are in the same plane should experience the same atmospheric pressure. Accordingly, when determining one or more relative positions between two or more mobile devices of the plurality of mobile devices, such altitude parameters may for example be used to determine whether the mobile devices are in the same plane and/or altitude differences between the mobile devices. For example, if the altitude differences between mobile devices are less than a predetermined altitude difference threshold value (e.g. 1 m, 2 m or 3 m to name a few examples), it may be determined that it is to be assumed that the mobile devices are in the same plane which simplifies the determining as disclosed above.

According to an exemplary embodiment of the different aspects, the method further comprises:

receiving one or more report messages.

For example, the one or more report messages may be received by the first mobile device (e.g. by a communication interface of the first mobile device) by receiving one or more radio signals containing the one or more report messages.

As disclosed above, the one or more report messages may at least partially contain said one or more further probe signal parameters, or said one or more further motion activity parameters, or said one or more further time stamp parameters, or said one or more further altitude parameters, or a combination thereof.

Each of the plurality of mobile devices may for example (e.g. periodically) transmit (e.g. broadcast) such a report message containing one or more parameters that have been determined or detected by the respective mobile device, or one or more parameters that have been received by the respective mobile device, or a combination thereof (e.g. by a communication interface of the respective mobile device). Each of the plurality of mobile devices may scan for radio signals containing report messages. For example, the one or more report messages may be received by the first mobile device when the first mobile device is scanning for radio signals containing report messages.

As an example, each report message transmitted by a mobile device of the plurality of mobile devices (e.g. each report message of the one or more report messages) may contain at least one of:

one or more probe signal parameters that have been determined by the respective mobile device, or one or more probe signal parameters that have been received by the respective mobile device, or a combination thereof;

for each of the one or more probe signal parameters, a time stamp parameter associated with the respective probe signal parameter;

a motion activity parameter associated with the respective mobile device of the plurality of mobile devices, or one or more motion further activity parameters associated with one or more further mobile devices of the plurality of mobile devices, or a combination thereof;

an altitude parameter that is indicative for an altitude of the respective mobile device, or one or more altitude parameters that have been received by the respective mobile device, or a combination thereof.

Accordingly, the method may further comprise:

transmitting a first report message containing one or more parameters that have been determined or detected by the first mobile device, or one or more parameters that have been received by the first mobile device, or a combination thereof.

For example, the first report message is transmitted (e.g. broadcasted) in a radio signal by the first mobile device (e.g. by a communication interface of the first mobile device).

As an example, the first report message may contain the first probe signal parameter, or the one or more further probe signal parameters, or the first time stamp parameter, or the one or more further time stamp parameters, or the first motion activity parameter, or the one or more further motion activity parameters, or the first altitude parameter, or a combination thereof.

This embodiment allows the first mobile device to share parameters that that have been determined by the respective mobile device, or one or more parameters that have been received by the first mobile device, or a combination thereof with one or more further mobile devices of the plurality of mobile devices. If each mobile device of the plurality of mobile devices transmits such report messages, this embodiment further allows to communicate parameters between mobile devices of the plurality of mobile devices which cannot directly communicate with each other as long as there exists a communication path via one or more further mobile devices of the plurality of mobile devices.

According to an exemplary embodiment of the different aspects, a weighted graph is obtained as a result of the determining one or more relative positions between two or more mobile devices of said plurality of mobile devices. As disclosed above, each node of the weighted graph may represent a mobile device of the plurality of mobile devices. Each edge of the graph may be assigned a weight that is associated with a probe signal parameter that is indicative for a distance between two mobile devices of the plurality of mobile devices. Furthermore, each edge of the graph may represent a relative direction between two mobile devices of the plurality of mobile devices (e.g. a relative angle between two mobile devices of the plurality of mobile devices).

For example, the method may further comprise:

obtaining absolute positioning information on one or more of the plurality of mobile devices; and adapting the weighted graph based on the obtained absolute positioning information.

For example, the absolute positioning information may indicate an absolute position of the one or more of the plurality of mobile devices or an orientation of the one or more mobile devices of the plurality of mobile devices. Examples of the absolute positioning information may represent position coordinates of one or more mobile devices of the plurality of mobile devices (e.g. one or more position coordinates of a global navigation satellite system (GNSS) like the global positioning system (GPS) indicating (an) absolute position(s) of one or more mobile devices), or heading information associated with one or more mobile devices of the plurality of mobile devices (e.g. heading information in degrees from magnetic north and/or true north indicating (a) travel direction(s) of one or more mobile devices), or a combination thereof. The absolute position information may for example be captured by the one or more mobile devices. For example, each of the one or more mobile devices of the plurality of mobile devices may comprise a GNSS sensor, or a compass sensor, or a combination thereof configured to capture absolute position information. For example, each mobile device of the plurality of mobile device which is able to capture absolute position information may include the absolute position information as parameter into the above disclosed report message which is transmitted by the mobile device.

Adapting the weighted graph based on the obtained absolute positioning information may be understood to mean that the weighted graph is scaled, or oriented, or associated with an absolute position, or a combination thereof based on the absolute positioning information.

According to an exemplary embodiment of the different aspects, the method further comprises:

displaying or causing displaying a graphical representation of the one or more determined relative positions.

For example, the graphical representation may be displayed or caused to be displayed on a graphical user interface (e.g. a graphical user interface of the first mobile device). The graphical representation may be a graphical representation of the nodes of the above disclosed weighted graph or a graphical representation of the nodes and the edges of the weighted graph. For example, the node representing the first mobile device may be in the center of the representation. By displaying such a representation, a user (e.g. a user of the first mobile device) may get an indication of the relative position(s) of one or more mobile devices of the plurality of mobile devices relatively to the first mobile device. For example, nodes representing mobile devices for which absolute positions have been determined may be displayed overlaid on a map section corresponding to the absolute positions. The map section may be represented by map data hold available by the device (e.g. stored in a memory of the device) or obtained (e.g. retrieved from a server over a communications network).

According to an exemplary embodiment of the different aspects, at least one of the first probe signal parameters and the one or more further probe signal parameters is a received signal strength parameter, or a path-loss parameter, or a round trip time parameter, or a propagation delay parameter, or a combination thereof. For example each of these probe signal parameters is a received signal strength parameter, or a path-loss parameter, or a timing advance parameter, or a round trip time parameter, or a propagation delay parameter, or a combination thereof.

The path-loss parameter may represent the ratio of power of a received probe signal (i.e. the receiving power at a mobile device receiving the probe signal, e.g. the power of the first probe signal at the first mobile device) and a transmitted probe signal (i.e. the transmission power with which the probe signal is transmitted by a mobile device, e.g. the power with which the first probe signal is transmitted by the second mobile device). For example, the path-loss parameter may be determined (e.g. calculated) based on a received signal strength parameter and a transmitter power parameter.

The received signal strength parameter may represent the power of a received probe signal. In other words, the received signal strength parameter may represent the receiving power of a probe signal at the mobile device receiving the probe signal (e.g. the power of the first probe signal at the first mobile device). An example, of a received signal strength parameter is a received signal strength indicator (RSSI) or a physical receiving power level (e.g. a Rx power level) in dBm.

Both the path-loss parameter and the received signal strength parameter depend on the distance between the two mobile devices.

A round trip time parameter may represent the length of time it takes for a probe signal transmitted by one mobile device of the plurality of mobile devices (e.g. the first probe signal transmitted by the second mobile device) to be received by another mobile device of the plurality of mobile devices (e.g. by the first mobile device) plus the length of time it takes for an acknowledgment (e.g. transmitted by the first mobile device) of that probe signal to be received (e.g. by the second mobile device). This parameter thus represents the propagation time of a radio signal travelling back and force between the two mobile devices which depends on the distance between the two mobile devices.

The propagation delay parameter may represent the length of time it takes for a probe signal transmitted by one mobile device of the plurality of mobile devices (e.g. the first probe signal transmitted by the second mobile device) to be received by another mobile device of the plurality of mobile devices (e.g. by the first mobile device). It may for example be determined based on the round trip time parameter or based on a transmission time stamp parameter contained in the probe signal indicating when the probe signal was transmitted.

According to an exemplary embodiment of the different aspects, the first motion activity parameter is determined at least based on an acceleration of the first mobile device, or a velocity of the first mobile device, or a development of a velocity of the first mobile device, or a development of an acceleration of the first mobile device, or measurements indicating an activity type a user of the first mobile device is performing, a combination thereof. Accordingly, each of the one or more further motion activity parameters may be determined at least based on an acceleration of the respective mobile device, or a velocity of the respective mobile device, or a development of a velocity of the respective mobile device, or a development of an acceleration of the respective mobile device, or different measurement values indicating an activity type a user of the first mobile device is performing, or a combination thereof.

As an example, the velocity of a mobile device may be measured by a velocity sensor of the mobile device; and the acceleration of a mobile device may be measured by an acceleration sensor of the mobile device. Alternatively or additionally, the velocity or the acceleration of a mobile device may be determined (e.g. calculated or estimated) based on subsequently determined absolute positions (e.g. based on a distance between two subsequent positions and a time difference between these two absolute positions where determined, e.g. measured or collected).

Measurement values indicating activity type a user of the first mobile device is performing may be taken by different sensors of the mobile device like a velocity sensor, an acceleration sensor, a vibration sensor, a positioning sensor and/or a pulse sensor. The measurement values taken from one or more of these different sensors may be compared with and/or matched to given patterns (e.g. from previous measurements) associated with different activity types such as walking, running, climbing stairs, biking, swimming and/or driving. For example, the activity type may then be determined to correspond to the activity type associated with the best fitting pattern.

According to an exemplary embodiment of the different aspects, a probe signal transmitted by a mobile device of the plurality of mobile devices (e.g. the first probe signal transmitted by the second mobile device) contains at least one of:
- an identifier of a mobile device transmitting the probe signal;
- a transmitter power parameter;
- a transmission time stamp indicating when the probe signal was transmitted.

Examples of an identifier of a mobile device are a basic service set identification (BSSID) of the mobile device, or the medium access control (MAC) address of the mobile device, or the service set identifier (SSID) of the mobile device, or a combination thereof.

The transmitter power parameter may represent the transmission power with which the probe signal is transmitted by the mobile device. An example, of a transmission power parameter is a transmitter signal strength indicator (TSSI) or a physical transmission power level (e.g. a Tx power level) in dBm. This may allow a mobile device receiving the probe signal to determine a path-loss parameter as probe signal parameter that is indicative for a distance between the transmitting mobile device and the receiving mobile device. Alternatively or additionally, the transmission power parameter may be shared with the other mobile devices of the plurality of mobile devices during registration as disclosed below. In embodiments where each mobile device of the plurality of mobile devices is configured to transmit its probe signals with the same power, it may not be necessary to share the transmission power parameter with the other mobile devices.

According to an exemplary embodiment of the different aspects, the plurality of mobile devices is part of or forms a wireless network.

Examples of a wireless network are a Bluetooth network, a BLE network and/or a WLAN network.

The wireless network may be configured as a mesh network, or an ad-hoc network, or a combination thereof.

A wireless ad-hoc network (WANET) may be understood to be a decentralized type of wireless network which does not rely on a pre-existing infrastructure, such as routers in wired networks or access points in managed (infrastructure) wireless networks. Instead, each mobile device of the plurality of mobile device may be configured to participate in routing in such a wireless ad-hoc network by forwarding data for other mobile devices of the plurality of mobile devices, for example the determination of which mobile devices forward information is made dynamically on the basis of network connectivity and a routing algorithm in use.

A wireless mesh network may be understood to be a network in which each mobile device of the plurality of mobile devices is configured to relay (e.g. forward) information (e.g. received parameters or messages) for the network such that all mobile devices cooperate in the distribution of information in the mesh network. Accordingly, a wireless mesh network may be understood to be a type of a wireless ad-hoc network.

The plurality of mobile devices which are part of or form the wireless network may be registered with each. This may be understood to mean that each devices of the plurality of mobile devices shares registration information with the other mobile devices of the plurality of mobile devices. For example, the registration information may be shared in the form of a registration message transmitted (e.g. broadcasted) in a radio signal by the respective mobile device. The registration message may for example contain an identifier of the respective mobile device, or a transmitter power parameter of the respective mobile device, or a transmission time stamp indicating when the registration message was transmitted, or a combination thereof.

As disclosed above, examples of an identifier of a mobile device are a basic service set identification (BSSID) of the mobile device, or the medium access control (MAC) address of the mobile device, or the service set identifier (SSID) of the mobile device, or a combination thereof.

The transmitter power parameter may for example represent the transmission power with which the mobile device will transmit probe signals. Alternatively or additionally, the transmission power parameter may be shared with the other mobile devices of the plurality of mobile devices by including the transmission power parameter in the probe signals transmitted by the respective mobile device of the plurality of mobile devices. In embodiments where each mobile device of the plurality of mobile devices is configured to transmit its probe signals with the same power, it may not be necessary to share the transmission power parameter with the other mobile devices. In embodiments where each mobile device of the plurality of mobile devices is configured to transmit its probe signals with the same power, it may not be necessary to share the transmission power parameter with the other mobile devices.

The transmission time stamp indicating when the registration message was transmitted may be used to synchronize the clocks of the plurality of mobile devices.

According to an exemplary embodiment of the different aspects, at least one (e.g. all) mobile device of the plurality of mobile devices is one of a smartphone, a smart wearable device like a smartwatch, a personal digital assistant (PDA), a tablet computer, a laptop computer, or a handheld computer like a handheld navigation device.

According to an exemplary embodiment of the different aspects, each of the plurality of mobile devices performs the method.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIGS. 4a and 4b show exemplary embodiments of a table containing parameters that have been determined by mobile devices according to the invention;

DETAILED DESCRIPTION OF THE FIGURES

The following description serves to deepen the understanding of the present invention and shall be understood to complement and be read together with the description of example embodiments of the invention as provided in the above SUMMARY section of this specification.

Figure 1:
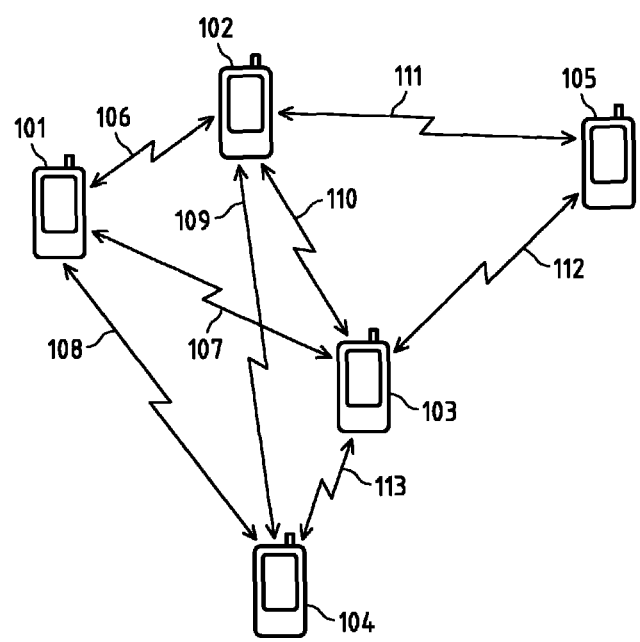
FIG. 1 is a block diagram of an exemplary embodiment of a system according to the invention.

FIG. 1 is a schematic high-level block diagram of a system 1 according to an exemplary aspect of the invention. System 1 comprises a plurality of mobile devices 101 to 105.

The plurality of mobile devices 101 to 105 forms a wireless mesh network. As disclosed above, a wireless mesh network may be understood to be a network in which each mobile device of the plurality of mobile devices 101 to 105 is configured to relay (e.g. forward) information (e.g. received parameters or messages) for the network such that all mobile devices cooperate in the distribution of information in the wireless mesh network. Communication between the plurality of mobile devices 101 to 105 takes place in a wireless fashion, e.g. on a Bluetooth based communication, or on a BLE based communication, or on a WLAN based communication, or based on a combination thereof, to name but a few examples. In this way, mobility and connectivity of each mobile device of the plurality of mobile devices 101 to 105 may be guaranteed as long as the respective mobile device can communicate with at least one other mobile device of the plurality of mobile devices.

Each mobile device of the plurality of mobile devices 101 to 105 periodically transmits (e.g. broadcast) or is configured to periodically transmit (e.g. broadcast) a probe signal (e.g. a Bluetooth signal, a BLE signal, or a WLAN signal) containing an identifier of the respective mobile device transmitting the probe signal. By way of example, it is assumed in the following that the probe signals transmitted (e.g. broadcasted) by the plurality of mobile devices 101 to 105 are transmitted with the same power.

Furthermore, each mobile device of the plurality of mobile devices 101 to 105 (e.g. periodically) transmits (e.g. broadcasts) a report message containing one or more parameters that have been determined or detected by the respective mobile device, or one or more parameters that have been received by the respective mobile device, or a combination thereof. Therein, it is not necessary that each mobile device of the plurality of mobile devices 101 to 105 communicates a respective report message directly to all other mobile devices of the plurality of mobile devices 101 to 105. If a mobile device of the plurality of mobile devices 101 to 105 is able to communicate a report message to another mobile device of the plurality of mobile devices 101 to 105, the other mobile device may be able to forward the report message to one or more further mobile devices of the plurality of mobile devices 101 to 105. Furthermore, the other mobile device may add further parameters (e.g. further parameters that have been determined by the other mobile device) to the report message prior to forwarding the report message.

As a non-limiting example, it is assumed in the following that transmission paths between the mobile devices of the plurality of mobile devices are indicated by reference signs 106 to 113. Such a transmission path may be understood to indicate "visibility" or connectivity between two devices of the plurality of mobile devices. That is, at least one mobile device of the two mobile devices which are connected by one of the transmission paths 106 to 113 is able to receive radio signals (e.g. probe signals) transmitted by the other mobile device of the two mobile devices. Preferably, two mobile devices which are connected by a transmission path may communicate (e.g. share information like parameters or messages, e.g. report or registration messages) with each other by radio signals travelling along the transmission path.

Figure 2:
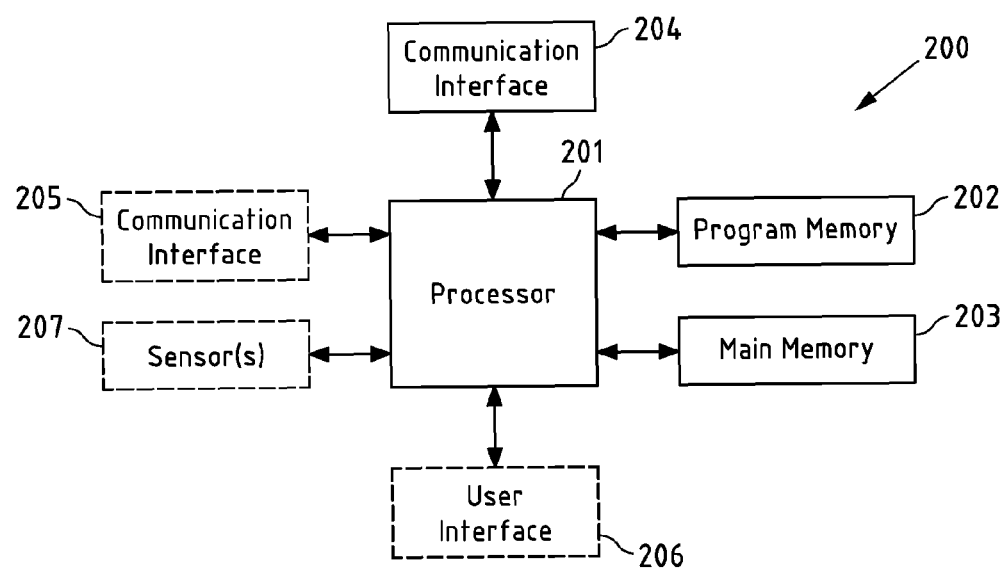
FIG. 2 is a block diagram of an exemplary embodiment of an apparatus according to the invention.

FIG. 2 is a block diagram of an apparatus 200 according to an exemplary aspect of the invention. Apparatus 200 may represent one mobile device of the plurality of mobile devices 101 to 105 of system 1 as illustrated in FIG. 1.

Apparatus 200 comprises a processor 201. Processor 201 may represent a single processor or two or more processors, which are for instance at least partially coupled, for instance via a bus. Processor 201 executes a program code stored in program memory 202 (for instance program code causing apparatus 200 to perform one or more of the embodiments of a method (or parts thereof) according to invention (as for instance further described below with reference to FIGS. 3a and 3b), when executed on processor 201), and interfaces with a main memory 203. Some or all of memories 202 and 203 may also be included into processor 201. One of or both of memories 202 and 203 may be fixedly connected to processor 201 or at least partially removable from processor 201, for instance in the form of a memory card or stick. Program memory 202 may for instance be a non-volatile memory. It may for instance be a FLASH memory (or a part thereof), any of a ROM, PROM, EPROM, MRAM or a FeRAM (or a part thereof) or a hard disc (or a part thereof), to name but a few examples. Program memory 202 may also comprise an operating system for processor 201. Program memory 202 may for instance comprise a relative positioning database and/or a registration database.

The relative positioning database may for example store representations of relative positioning information like probe signal parameters, etc.

The registration database may for example store representations of registration information like identifiers and/or transmission power parameters of the mobile devices 101 to 105.

Main memory 203 may for instance be a volatile memory. It may for instance be a DRAM memory, to give non-limiting example. It may for instance be used as a working memory for processor 201 when executing an operating system and/or programs.

Processor 201 further controls a communication interface 204 configured to communicate with other devices (e.g. with mobile devices 101 to 105), for example by receiving and/or transmitting (e.g. broadcasting) radio signals (e.g. probe signals). The communication interface 204 may for example support a non-cellular wireless communication technique like Bluetooth, BLE, WLAN to name but a few examples.

Optionally, processor 201 further controls an optional communication interface 205 supporting a cellular communication technique (e.g. a 2G/3G/4G/5G cellular radio communication).

The communication interfaces 204 and 205 may thus comprise circuitry such as modulators, filters, mixers, switches and/or one or more antennas to allow wireless transmission and/or reception of non-cellular radio signals or cellular radio signals.

Processor 201 further controls an optional graphical user interface 206 configured to present information to a user of apparatus 200 and/or to receive information from such a user. Graphical user interface 206 may for example be the standard user interface via which a user of apparatus 200 controls other functionality thereof. Examples of such a user interface are a touch-sensitive display, or a display, etc.

Furthermore, processor 201 controls one or more sensors 207. Sensory 207 may comprise at least one of an acceleration sensor, a velocity sensor, a compass sensor, a positioning sensor (e.g. a GNSS sensor), a pressure sensor like a barometer.

The components 202 to 207 of apparatus 200 may for instance be connected with processor 201 by means of one or more serial and/or parallel busses.

It is to be understood that apparatus 200 may comprise various other components.

Figure 3A:
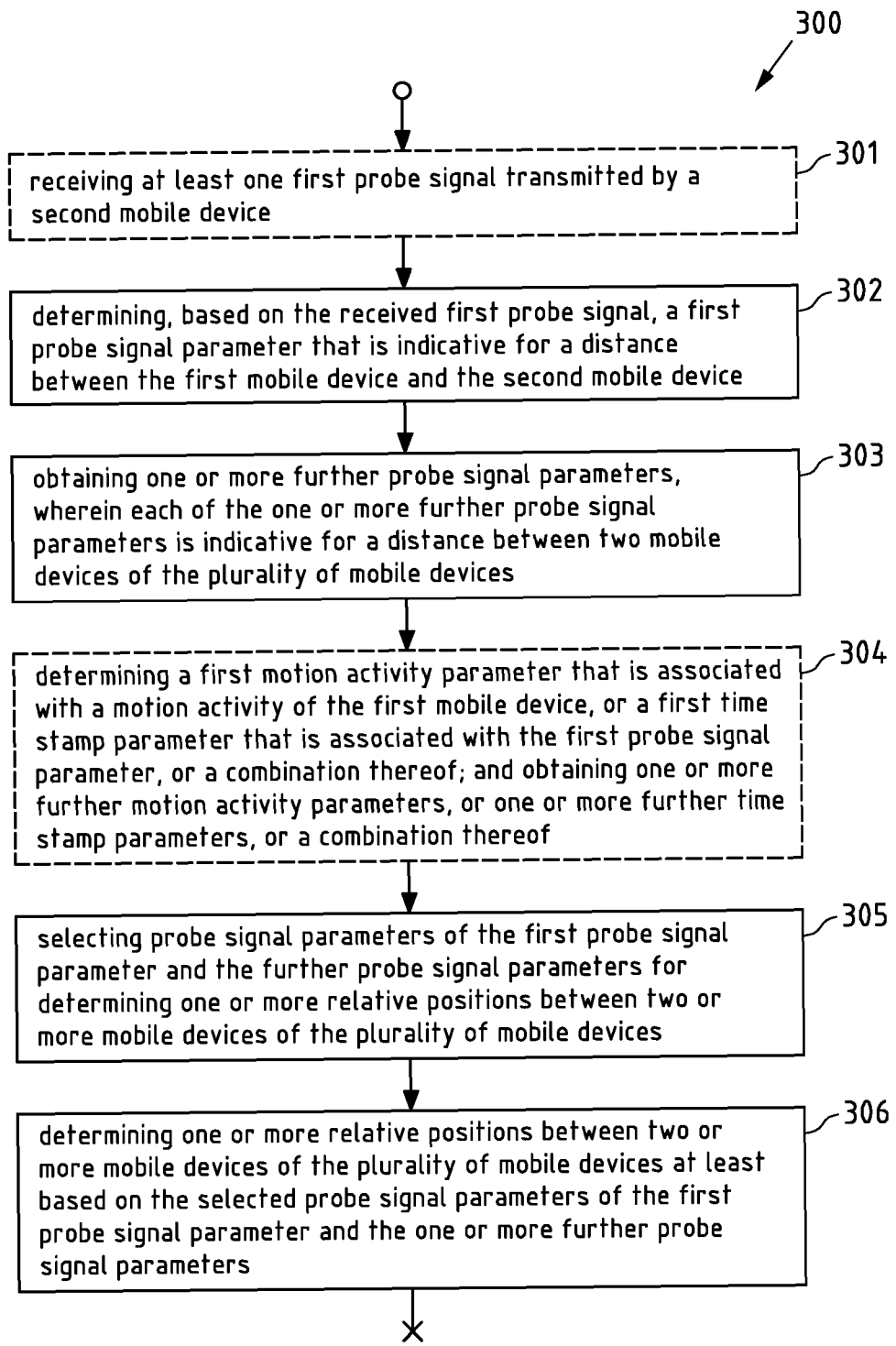
FIG. 3a is a flow chart illustrating an exemplary embodiment of a method according to the invention.

FIG. 3a is a flowchart 300 illustrating an exemplary embodiment of a method according to the invention. In the following, it is assumed for illustrative purposes that the steps of this flowchart 300 are performed by the first mobile device 101 of the plurality of mobile devices 101 to 105 of FIG. 1. Furthermore, it is assumed that the first mobile device 101 corresponds to apparatus 200 of FIG. 1. It is however noted that the invention is not limited this. For example, the steps of flowchart 300 may be performed by each mobile device of the plurality of mobile devices 101 to 105.

The first mobile device 101 receives at least one first probe signal transmitted (e.g. broadcasted) by the second mobile device 102 (optional step 301).

For example, the first mobile device 101 may scan its current location for probe signals. As indicated by transmission paths 106, 107 and 108, the first mobile device is able to receive probe signals transmitted (e.g. broadcasted) by mobile devices 102, 103 and 104. Accordingly, the first mobile device may receive in addition to the first probe signal transmitted by the second mobile device 102 probe signals transmitted by mobile devices 103 and 105, respectively, in optional step 301. Furthermore, the first mobile device 101 may receive probe signals from other fixed radio sources that are operational in the vicinity of the first mobile device 101.

Subsequently, the first mobile device 101 determines, based on the received first probe signal, a first probe signal parameter that is indicative for a distance between the first mobile device 101 and the second mobile device 102.

As disclosed above, determining a probe signal parameter may comprise determining a value of a physical quantity of the probe signal or associated with the probe signal. Examples of such physical quantities as disclosed above are a received signal strength parameter, or a path-loss parameter, or a round trip time parameter, or a propagation delay parameter, or a combination thereof.

By way of example, it assumed in the following that the first probe signal parameter and any other probe signal parameter determined by any mobile device of the plurality of mobile devices is a received signal strength parameter. An example, of a received signal strength parameter is a received signal strength indicator (RSSI) or a physical receiving power level (e.g. a Rx power level) in dBm.

For example, the communication interface 205 may measure, when the first probe signal is received in step 301, the receiving power of the first probe signal at the first mobile device 101. Based on the measured receiving power the received signal strength parameter may be then determined (e.g. calculated) in step 302.

Additionally, the first mobile device 101 obtains one or more further probe signal parameters (step 303). Each of the one or more further probe signal parameters is indicative for a distance between two mobile devices of the plurality of mobile devices 101 to 105.

The one or more further probe signal parameters may for example be obtained by determining the one or more further probe signal parameters, or by receiving the one or more further probe signal parameters, or by a combination thereof.

For example, the first mobile device 101 may determine further probe signal parameters based on the received probe signals transmitted by the mobile devices 103 and 104, respectively, in a similar manner to determining the first probe signal parameter (cf. step 302) in step 304.

Additionally, the first mobile device 101 may receive one or more report messages containing further probe signal parameters. As disclosed above, each mobile device of the plurality of mobile devices 101 to 105 transmits (e.g. broadcasts) a report message containing one or more parameters that have been determined by the respective mobile device, or one or more parameters that have been received by the respective mobile device, or a combination thereof. Preferably, the report messages may contain at least one or more probe signal parameters. The first mobile device 101 may receive report messages transmitted (e.g. broadcasted) by mobile devices 102, 103 and 104, respectively, in step 303.

Optionally, the first mobile device 101 determines a first motion activity parameter that is associated with a motion activity of said first mobile device, or a first time stamp parameter that is associated with said first probe signal parameter, or a first altitude parameter that is indicative for an altitude of the first mobile device, or a combination thereof; and obtains one or more further motion activity parameters, or one or more further time stamp parameters, or a combination thereof (optional step 304).

The first motion activity parameter may represent the motion activity of the first mobile device 101 during a predetermined period of time or at a predetermined point of time. To this end, the first motion activity parameter may be determined (e.g. measured or calculated) based on a velocity of the first mobile device 101, or an acceleration of the first mobile device 101, or a development of an velocity of the first mobile device 101, or a development of an acceleration of the first mobile device 101, or measurement values indicating an activity type a user of the mobile device is performing, or a combination thereof. The velocity and/or the acceleration of the first mobile devices may for example be measured by one of the sensors 207 as disclosed above.

By way of example, it is assumed in the following, that the first motion activity parameter (and any other motion activity parameter) may be calculated as follows:

$$v_f = (t_0 * a) + v_i$$

$$d = v_f * t_0$$

$$\text{map} = d/A$$

with $v_f$=final velocity of the first mobile device 101 in a certain direction after $t_0$, $t_0$=predetermined period of time (e.g. 10 s), a=acceleration of the first mobile device 101 in the certain direction during $t_0$, $v_i$=initial velocity of the first mobile device 101 in the certain direction before $t_0$, d=distance covered during $t_0$, A=predetermined accuracy (e.g. 2 m), and map=motion activity parameter.

The first time stamp parameter may represent a date, or a time of day, or a combination thereof indicating when the first probe signal was received by the first mobile device 101 or when the first probe signal parameter was determined (e.g. collected or measured or calculated) by the first mobile device 101.

The first altitude parameter may represent the altitude of the first mobile device 101 during a predetermined period of time or at a predetermined point of time. To this end, the first altitude parameter may be determined by detecting the atmospheric pressure at the first mobile device during this predetermined period of time or at this predetermined point of time. The atmospheric pressure of the first mobile devices may for example be detected by one of the sensors 207 (e.g. a barometer) as disclosed above.

Furthermore, for each of the further probe signal parameters determined by the first mobile device 101, the first mobile device 101 may determine a respective further motion activity parameter, or a further respective time stamp parameter, or a further altitude parameter or a combination thereof in a similar manner to determining the first motion activity parameter, or the first time stamp parameter, or a combination thereof.

Additionally, if the first mobile device 101 receives one or more report messages containing one or more probe signal parameters, the one or more report messages may also contain one or more motion activity parameters, one or more time stamp parameters, one or altitude parameters, or a combination thereof.

As disclosed above, each mobile device of the plurality of mobile devices 101 to 105 periodically transmits (e.g. broadcasts) a report message containing one or more parameters that have been determined by the respective mobile device, or one or more parameters that have been received by the respective mobile device, or a combination thereof. For example, the first mobile device 101 may receive report messages transmitted (e.g. broadcasted) by mobile devices 102, 103 and 104, respectively, in step 303 and/or step 304. It is to be understood that steps 303 and 304 may also be performed in a single step.

The report messages may represent a table, wherein each row of the table contains a representation of:
- the probe signal parameter that is indicative for a distance between two mobile devices of the plurality of mobile devices 101 to 105;
- the identifier of the receiving mobile device by which the probe signal was received and the probe signal parameter determined;
- the identifier of the transmitting mobile device by which the probe signal was transmitted based on which the probe signal parameter was determined;
- the motion activity parameter (e.g. calculated as described above) associated with the receiving mobile device that was determined for the probe signal parameter;
- an altitude parameter that is indicative for an altitude of a mobile device of the plurality of mobile devices 101 to 105.

In a similar manner, the parameters that have been determined, obtained and received by the first mobile device may be stored in the relative positioning database in the program memory 202. For example, the relative positioning database may also represent a table like the report messages.

An exemplary format of a row of the table represented by a report message and/or by a relative positioning database may be as follows:
[identifier of the receiving mobile] [identifier of the transmitting mobile device] [probe signal parameter value] [time stamp parameter value] [motion activity parameter value] [altitude parameter]

This format allows a simple combination of parameters determined by different mobile devices of the plurality of mobile devices 101 to 105.

FIG. 4a shows an exemplary embodiment of a table 400a only containing parameters that have been determined by the first mobile device 101. FIG. 4b shows an exemplary embodiment of a table 400b containing the parameters that have been determined by the first mobile device 101 (cf. rows 401 to 403) and the parameters that have been determined by mobile devices 102 and 103, respectively (cf. rows 404 to 409).

In table 400a and 400b, the unit of the signal strength parameter values is dBm; and the time stamp parameter values are provided in unix time which means that the time stamp parameter value is the number of seconds that have elapsed since 00:00:00 Coordinated Universal Time (UTC), Thursday, 1 Jan. 1970 minus the number of leap seconds that have taken place since then; and the motion activity parameter values which describes a ratio between a covered distance d and an accuracy A as described above is without a unit. Tables 400a and 400b do not contain altitude parameters.

The first mobile device 101 selects probe signal parameters of the first probe signal parameter and the further probe signal parameters for determining one or more relative positions between two or more mobile devices of the plurality of mobile devices (step 305). As a result of the selecting selected probe signal parameters (e.g. more than one, e.g. a plurality of selected probe signal parameters) may be obtained. The selected probe signal parameters may comprise all or a part of said first probe signal parameter and said further probe signal parameters.

For example, all or a part of the probe signal parameters contained in the registration database stored in program memory 202 may be selected in step 305. By way of example, it is assumed in the following registration database represents table 400b of FIG. 4b.

Two or more probe signal parameters of the first probe signal parameter and the one or more further probe signal parameters may be understood to be colliding probe signal parameters if they are indicative for a distance between the same two mobile devices of said plurality of mobile devices and if they are different (e.g. represent different values). For example, the received signal strength value that is indicative for the distance between the first mobile device 101 and the second mobile device 102 is "−70" in row 401 of table 400b, whereas it is "−72" in row 404. Accordingly, the received signal strength parameters of rows 401 and 404 are considered to be colliding probe signal parameters. The same holds for the received signal strength parameters of rows 406 and 408.

Figure 3B:
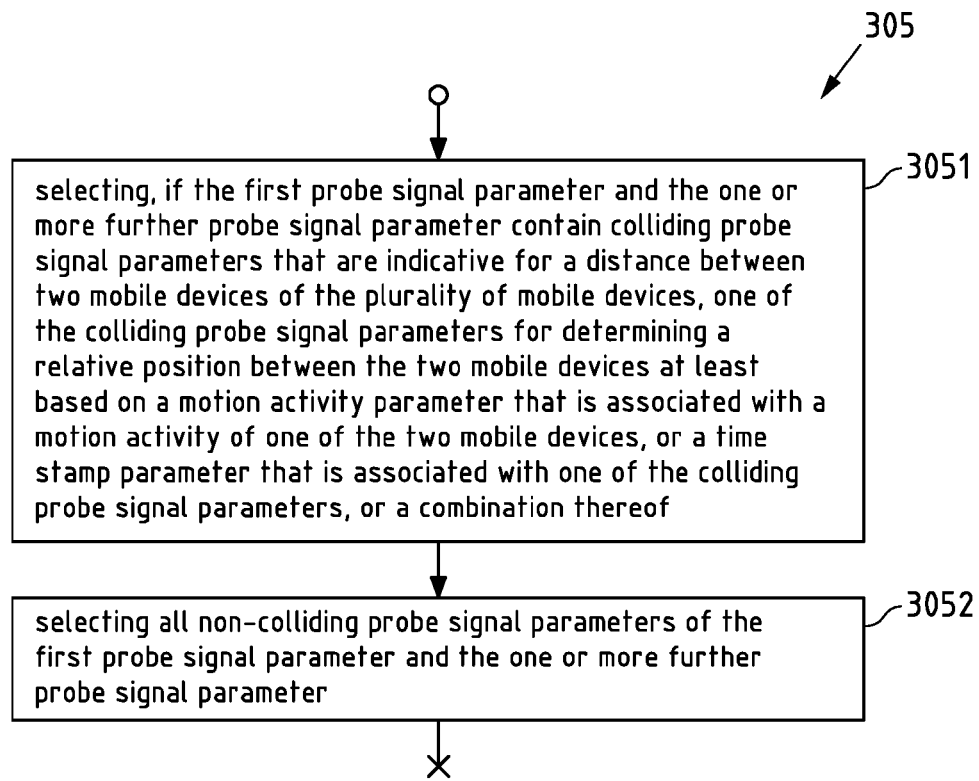
FIG. 3b illustrates optional steps of an exemplary embodiment of a method according to the invention.

FIG. 3b shows optional steps 3051 and 3052 that may be performed in step 305 of flowchart 300 (i.e. when selecting probe signal parameters of the first probe signal parameter and the further probe signal parameters for determining one or more relative positions between two or more mobile devices of the plurality of mobile devices).

If the first probe signal parameter and the one or more further probe signal parameter contain colliding probe signal parameters that are indicative for a distance between the same two mobile devices of the plurality of mobile devices, one of the colliding probe signal parameters for determining a relative position between the two mobile devices is selected (step 3051). The selecting is at least based on a motion activity parameter that is associated with a motion activity of one of the two mobile devices, or a time stamp parameter that is associated with one of the colliding probe signal parameters, or a combination thereof.

Considering the above identified colliding probe signal parameters of rows 401 and 404, and of rows 406 and 408, this means that the first mobile device 101 selects one of the colliding probe signal parameters of rows 401 and 404 and one of the colliding probe signal parameters of rows 406 and 408.

For example, the selecting one of said colliding probe signal parameters comprises at least one of:
   determining whether a difference between the time stamp parameters that are associated with said colliding probe signal parameters is greater than or equal to or less than a time threshold value;
   determining whether a value represented by one of said colliding probe signal parameters is greater than or equal to or less than a value represented by another one of said colliding probe signal parameters.

An example of a selection algorithm according to which the selecting in step 3051 is performed is given below, wherein the values of the colliding probe signal parameters are represented by [RSSI_AB] and [RSSI_BA], wherein [RSSI_AB] was determined by the mobile device having the identifier [MOBILE_DEVICE_A_ID], wherein [RSSI_BA] was determined by the mobile device having the identifier [MOBILE_DEVICE_B_ID], wherein the value represented by the time stamp associated with [RSSI_AB] is represented by [time_stamp_1] and the value represented by the time stamp associated with [RSSI_BA] is represented by [time_stamp_2], and wherein the value of the motion activity parameter that is indicative of the motion activity of [MOBILE_DEVICE_A_ID] is represented by [motion_activity_A] and the value of the motion activity parameter that is indicative of the motion activity of [MOBILE_DEVICE_B_ID] is represented by [motion_activity_B]:
SAMPLE 1: [MOBILE_DEVICE_A_ID] [MOBILE_DEVICE_B_ID] [RSSI_AB] [time_stamp_1] [motion_activity_A]
SAMPLE 2: [MOBILE_DEVICE_B_ID] [MOBILE_DEVICE_A_ID] [RSSI_BA] [time_stamp_2] [motion_activity_B]
If [time_stamp_2]−[time_stamp_1] is greater than time threshold value: select SAMPLE 2 or [RSSI_BA];
If [time_stamp_2]−[time_stamp_1] is less than or equal to time threshold value:
   if [RSSI_BA] is greater than [RSSI_AB]: select SAMPLE 2 or [RSSI_BA];
   else: select SAMPLE 1 or [RSSI_AB];

Therein, the time threshold value defines a relevancy time window which may be highly dependent on the application and may be determined based on the mobility of the mobile devices of the plurality of mobile devices 101 to 105. For example, freshness of the probe signal parameters is less important in deployments where the mobile devices are relatively static, but it becomes critical in scenarios where the mobile devices move a lot.

As disclosed above, the motion activity parameter associated with a mobile device may be considered as indication for mobility of the mobile device (e.g. the mobility of a mobile device when a probe signal parameter was determined (e.g. collected or measured or calculated) by the mobile device). Accordingly, the time threshold value may be determined (e.g. selected or calculated) at least based on a motion activity parameter that is indicative for a motion activity of one of the two mobile devices for which the colliding probe signal parameters indicate a distance. Considering the above identified colliding probe signal parameters of rows 401 and 404, this means that the time threshold value for selecting one of the colliding probe signal parameters is determined based at least on one of the motion activity parameters contained in rows 401 and 404. Similarly, the time threshold value for selecting one of the colliding probe signal parameters rows 406 and 408 may be determined based at least on one of the motion activity parameters contained in rows 406 and 408.

As a result of the selecting in step 3051, the (younger and greater) probe signal parameters of rows 401 and 406 may be selected.

Additionally, the first mobile device 101 may select all non-colliding signal parameters of the first probe signal parameter and the further probe signal parameters (step 3052).

Accordingly, as a result of the selecting of steps 3051 and 3052 or step 305, the probe signal parameters of rows 401 and 406 and the probe signal parameters of rows 402, 403, 405, 407 and 409 may be obtained as selected probe signal parameters. Therein, the probe signal parameters of rows 403 and 407 represent the same received signal strength value (i.e. "−92") and are thus considered to be non-colliding probe signal parameters.

The selected probe signal parameters may then be used by the first mobile device 101 for determining one or more relative positions between two or more mobile devices of the plurality of mobile devices 101 to 105 (step 306).

A relative position between two or more mobile devices may be understood to represent the position of these two or more mobile devices relatively to each other. In other words, a relative position between two or more mobile devices may represent a relative direction (e.g. a relative angle) and a relative distance between the two or more mobile devices.

In the following, it is assumed, for determining one or more relative positions between two or more mobile devices of the plurality of mobile devices 101 to 105, that the mobile devices are in the same plane. As disclosed above, this may allow to simplify determining the relative positions in certain situations (e.g. when the mobile devices are expected to be on the same floor of a building or on ground surface). In other situations (e.g. when the mobile devices are expected to be on different floors of a building), this assumption may however not be used. For example, user input of a user indicating whether this assumption is to be used for determining one or more relative positions may be captured (e.g. by user interface 206 of the first mobile device 101). Alternatively or additionally, it may be determined based on one or more altitude parameters whether the mobile devices of the plurality of mobile devices 101 to 105 are in the same plane as disclosed above.

The determining in step 306 may be performed according to a (e.g. predetermined) trilateration algorithm. For example, the selected probe signal parameters may be input parameters of the trilateration algorithm. The trilateration algorithm may be a deterministic algorithm which is used by each mobile device of the plurality of mobile devices 101 to 105. Since all probe signals transmitted by the mobile devices of the plurality of mobile devices 101 to 105 are transmitted with the same power, the received signal strength parameter values may for example be used as representations of the distances between the mobile devices by the trilateration algorithm. It is not necessary to normalize the received signal strength parameter values.

Figure 5A:
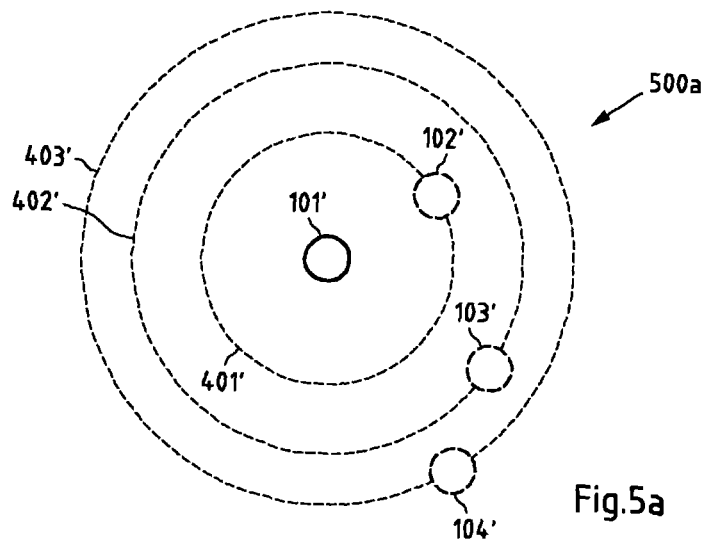
FIGS. 5a to 5c illustrate an exemplary application of a trilateration algorithm for determining one or more relative positions between two or more mobile devices according to the invention.
Figure 5B:
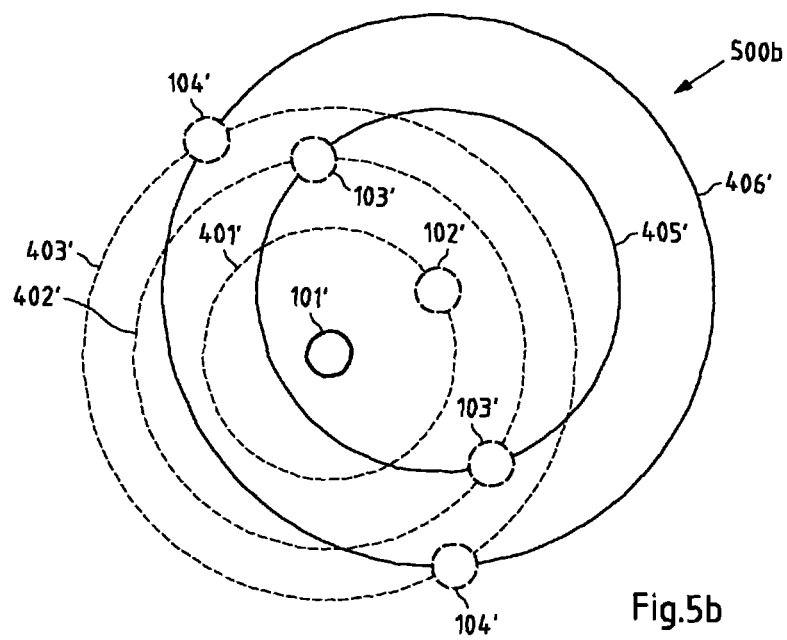
Figure 5C:
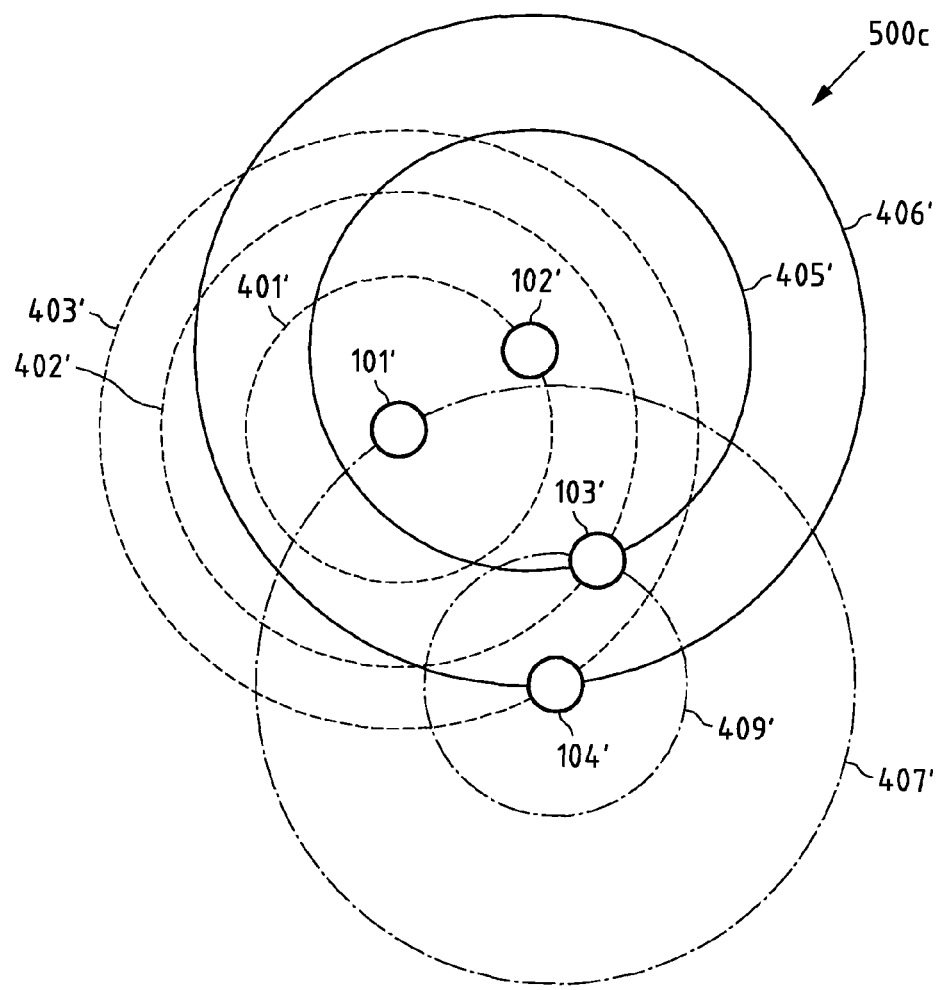

As exemplary shown by FIGS. 5*a* to 5*c*, the trilateration algorithm needs at least probe signal parameters that have been determined by three different mobile devices of the plurality of mobile devices 101 to 105 to determine one or more relative positions if it is assumed that the mobile devices 101 to 105 are in the same plane. Otherwise (i.e. without this assumption), the trilateration algorithm would need at least probe signal parameters that have been determined by four different mobile devices of the plurality of mobile devices 101 to 105 to determine one or more relative positions. In FIGS. 5a to 5c, the nodes 101', 102', 103' and 104' represent the mobile devices 101, 102, 103 and 104, respectively. Furthermore, the radiuses of the circles 401', 402', 403', 405', 406', 407' and 409' corresponds to the received signal strength parameter values of the selected probe signal parameters of rows 401, 402, 403, 405, 406, 407 and 409, respectively.

FIG. 5a only shows circles 401', 402' and 403' which corresponds to the probe signal parameters of rows 401, 402, 403 that have been determined by the first mobile device 101. Accordingly, node 101' is the center of circles 401', 402' and 403'. Due to the lack of directionality in the scalar measurement of the received signal strength parameter value, the nodes 102, 103 and 104 representing mobile devices 102, 103 and 104 may anywhere on the circles 401', 402' and 403'.

In FIG. 5b, circles 405' and 406' which corresponds to the probe signal parameters of rows 405 and 406 that have been determined by mobile device 102 are added. Node 102' is the center of circles 405' and 406'. The number of positions for nodes 103' and 104' representing mobile devices 103 and 104 is accordingly reduced to the two respective positions indicated by nodes 103' and 104' in FIG. 5b.

In FIG. 5b, circles 407' and 409' which corresponds to the probe signal parameters of rows 407 and 409 that have been determined by mobile device 104 are added. Node 104' is the center of circles 405' and 406'. Now, it is possible to determine the positions of nodes 101', 102', 103' and 104' relatively to each other as indicated in FIG. 5c.

As a result of the determining in step 306, a weighted graph or a representation of a weighted graph may be obtained.

Figure 6A:
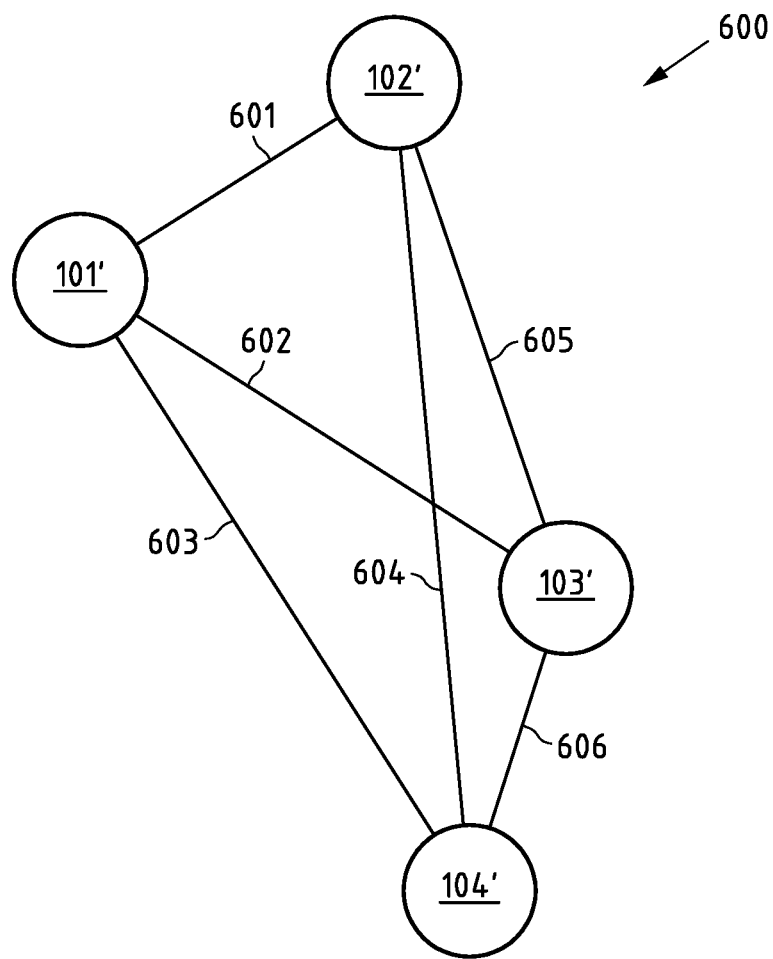
FIGS. 6a and 6b show an exemplary embodiment of a weighted graph according to the invention.

An exemplary embodiment of such a weighted graph 600 is shown in FIG. 6a. Since it has been assumed for determining the one or more relative, the weighted graph 600 is two-dimensional which means that the edges and nodes of the weighted graph are in the same plane. Each node 101', 102', 103' and 104' of the weighted graph 600 represents a mobile device of the plurality of mobile devices 101 to 105. In particular, the nodes 101', 102', 103' and 104' represent the mobile devices 101, 102, 103 and 104, respectively. Each edge 601 to 606 of the graph 600 may be assigned a weight that is associated with a probe signal parameter that is indicative for a distance between two mobile devices of the plurality of mobile devices. Furthermore, each edge of the graph may represent a relative direction between two mobile devices of the plurality of mobile devices (e.g. a relative angle between two mobile devices of the plurality of mobile devices).

By way of example, the weight of the edge 601 may be represented by the received signal strength value of row 401, the weight of the edge 602 may be represented by the received signal strength value of row 402, the weight of the edge 603 may be represented by the received signal strength value of row 403 or 407, the weight of the edge 604 may be represented by the received signal strength value of row 406, the weight of the edge 605 may be represented by the received signal strength value of row 405, the weight of the edge 606 may be represented by the received signal strength value of row 409.

From graph 600, the relative directions from mobile devices 101 to 104 represented by nodes 101' to 104' to each other node as well as the relative distance between them can be derived. The graph 600 may be at least partially (e.g. only the nodes) displayed on graphical user interface 206 of the first mobile device 101.

The absolute orientation, the absolute positions of the mobile devices and the absolute distance between mobile devices 101 to 104 cannot be derived from graph 600. However, by use of further absolute positioning information graph 600 may be accordingly adapted (e.g. oriented and/or scaled).

Adapting the weighted graph based on the obtained absolute positioning information may be understood to mean that the weighted graph is scaled, or oriented, or associated with an absolute position, or a combination thereof based on the absolute positioning information.

Examples of the absolute positioning information may represent position coordinates of one or more mobile devices of the plurality of mobile devices (e.g. one or more position coordinates of a global navigation satellite system (GNSS) like the global positioning system (GPS) indicating (an) absolute position(s) of one or more mobile devices), or heading information associated with one or more mobile devices of the plurality of mobile devices (e.g. heading information in degrees from magnetic north and/or true north indicating (a) travel direction(s) of one or more mobile devices), or a combination thereof. The absolute position information may for example be captured by the one or more of the mobile devices 101 to 104. For example, the first mobile device 101 may comprise a GNSS sensor, or a compass sensor, or a combination thereof as part of the sensors 207. For example, each mobile device of the plurality of mobile device which is able to capture absolute position information may include the absolute position information as parameter into the above disclosed report message which is transmitted by the mobile device.

For example, if the first mobile device 101 has a compass sensor as part of the sensors 207, it may orient the graph based on the heading information captured by the compass sensor.

Figure 6B:
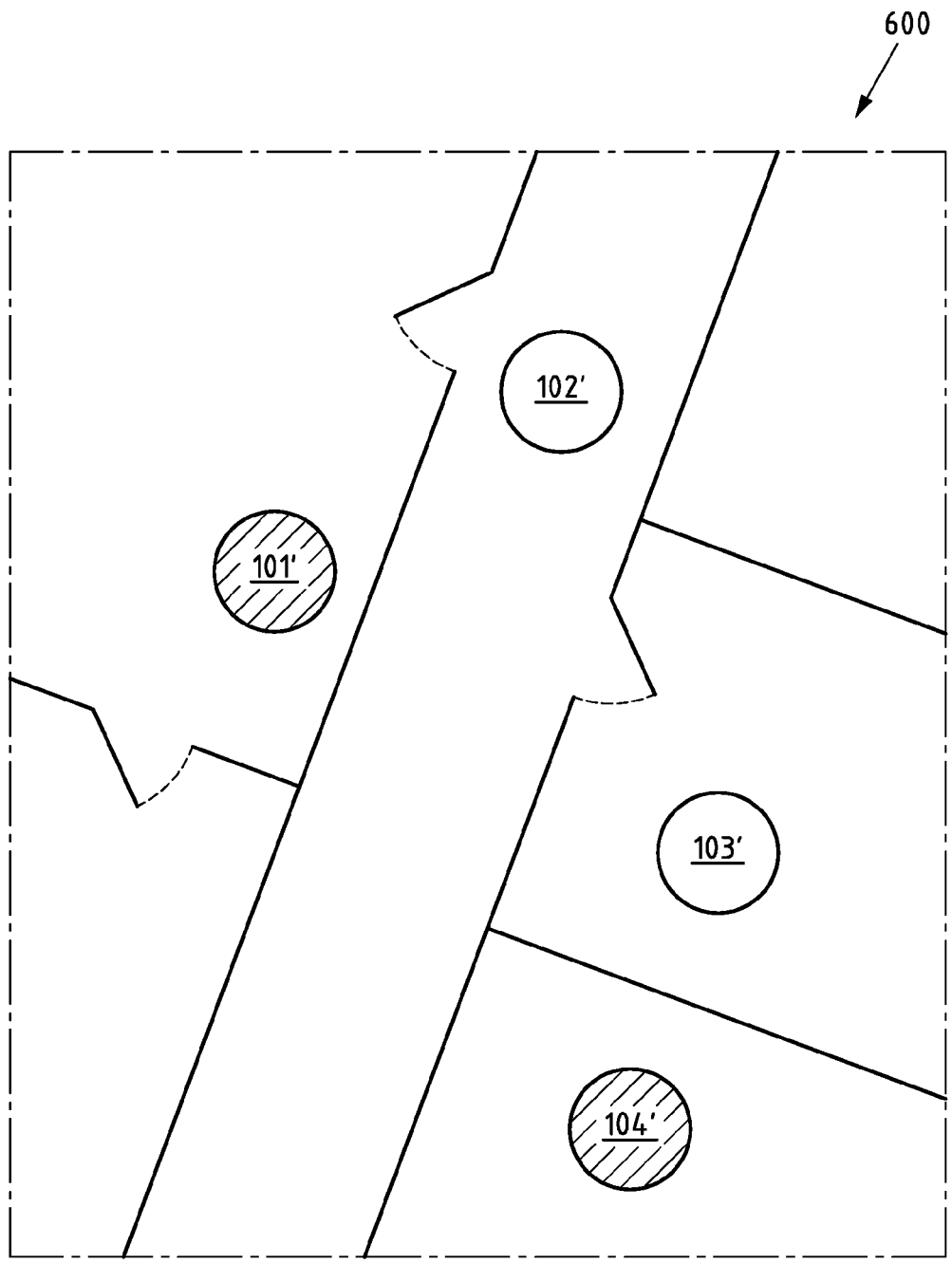

For example, if the first mobile device obtains absolute position coordinates of at least two mobile devices of the mobile devices 101 to 104, the graph 600 may be scaled and associated with these absolute positions. By way of example, this may be used to display the adapted graph 600 at least partially together with a map section corresponding to the absolute position coordinates. This is exemplary shown in FIG. 6b where nodes 101' to 104' representing mobile devices 101 to 104 are displayed together with a section of a floorplan. As indicated by the shading of nodes 101' and 104', absolute positioning coordinates may have been obtained for mobile devices 101 and 104 in this example.

To summarize, the present invention provides a way to determine relative positions without the need for infrastructure. As a result of the determining a weighted graph may be obtained that can be associated to real-world positions when at least one of the mobile devices knows its absolute position (e.g. has a GPS fix). Accurate absolute distance determination is possible if at least two mobile devices know their absolute positions (e.g. have a GPS fix).

A possible application scenario of the present invention, may be a group of firefighters in a building in which the local positioning infrastructure is either non-existent or damaged. Each member of the group may have a mobile device (e.g. one of mobile devices 101 to 105). The mobile devices may form a wireless mesh network. As each member of the group is aware of each other, their mobile devices can scan for known SSIDs. These scans are then combined in a deterministic weighted graph (e.g. graph 600), the underlying trilateration and selection algorithms for which ensures that the same scan data performed by two mobile devices will produce the same result. As often as possible, devices share scan results with each other. The solution for the weighted graph provides relative angles (e.g. in 2D or 3D space) between the nodes of the graph (e.g. nodes 101' to 104' of graph 600) and thereby relative positions of the mobile devices (e.g. mobile devices 101 to 104). When at least two of the devices in the mesh network can position themselves with an external positioning infrastructure (e.g. PS, Wi-Fi, network cell), the entire wireless mesh network can be georeferenced and the relative positions of all the mobile devices can be resolved to an absolute position in the external positioning system.

Figure 7:
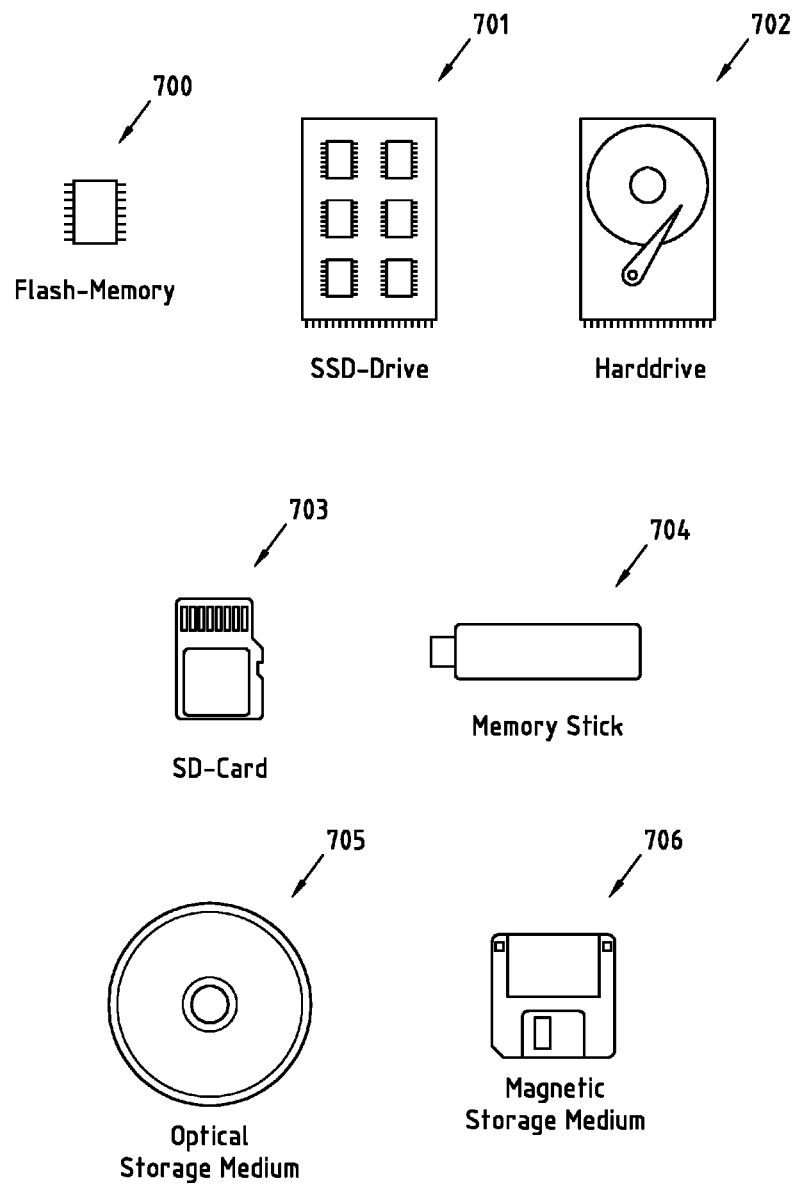
FIG. 7 shows examples of tangible storage media according to the invention.

FIG. 7 is a schematic illustration of examples of tangible storage media according to the present invention that may for instance be used to implement program memory 202. To this end, FIG. 7 displays a flash memory 700, which may for instance be soldered or bonded to a printed circuit board, a solid-state drive 701 comprising a plurality of memory chips (e.g. Flash memory chips), a magnetic hard drive 702, a Secure Digital (SD) card 703, a Universal Serial Bus (USB) memory stick 704, an optical storage medium 705 (such as for instance a CD-ROM or DVD) and a magnetic storage medium 706.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processor 101 of FIG. 1*b* could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording A, or B, or C, or a combination thereof may be understood to include the following:
(i) A,
(ii) B,
(iii) C,
(iv) A and B,
(v) A and C,
(vi) B and C,
(vii) A and B and C.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

The invention claimed is:

1. A method for relative positioning performed by a first mobile device, wherein said first mobile device is part of a plurality of mobile devices, said method comprising:
   determining a first probe signal parameter that is indicative for a distance between said first mobile device and a second mobile device of said plurality of devices;
   obtaining one or more further probe signal parameters, wherein each of said one or more further probe signal parameters is indicative for a distance between two mobile devices of said plurality of mobile devices;
   selecting probe signal parameters of said first probe signal parameter and said further probe signal parameters for determining one or more relative positions between two or more mobile devices of said plurality of mobile devices; and
   determining one or more relative positions between two or more mobile devices of said plurality of mobile devices at least based on said selected probe signal parameters of said first probe signal parameter and said one or more further probe signal parameters.

2. The method according to claim 1, said method further comprising:
   receiving at least one first probe signal transmitted by said second mobile device, wherein said first probe signal parameter is determined based on said received at least one first probe signal.

3. The method according to claim 1, wherein, if said first probe signal parameter and said one or more further probe signal parameter contain colliding probe signal parameters that are indicative for a distance between two mobile devices of said plurality of mobile devices, said selecting comprises:
   selecting one of said colliding probe signal parameters for determining a relative position between said two mobile devices at least based on a motion activity parameter that is associated with a motion activity of one of said two mobile devices, or a time stamp parameter that is associated with one of said colliding probe signal parameters, or a combination thereof.

4. The method according to claim 3, wherein said selecting one of said colliding probe signal parameters comprises at least one of:
   determining whether a difference between time stamp parameters that are associated with said colliding probe signal parameters is greater than or equal to or less than a time threshold value, or
   determining whether a value represented by one of said colliding probe signal parameters is greater than or equal to or less than a value represented by another one of said colliding probe signal parameters.

5. The method according to claim 4, wherein said time threshold value is determined at least based on a motion activity parameter that is indicative for a motion activity of one of said two mobile devices.

6. The method according to claim 1, said method further comprising:
   determining a first motion activity parameter that is associated with a motion activity of said first mobile device, or a first time stamp parameter that is associated with said first probe signal parameter, or a combination thereof; and
   obtaining one or more further motion activity parameters, or one or more further time stamp parameters, or a combination thereof.

7. The method according to claim 6, wherein said selected probe signal parameters of said first probe signal parameter and said one or more further probe signal parameters are selected at least partially based on said first motion activity parameter, said first time stamp parameter, said one or more further motion activity parameters, and said one or more further time stamp parameters.

8. The method according to claim 6, wherein said one or more further probe signal parameters, or said one or more further motion activity parameters, or said one or more further time stamp parameters, or a combination thereof are at least partially obtained by receiving one or more report messages.

9. The method according to claim 1, wherein said determining one or more relative positions between two or more mobile devices of said plurality of mobile devices is further at least based on a first altitude parameter that is indicative for an altitude of said first mobile device and/or one or more further altitude parameters, wherein each of said one or more further altitude parameters is indicative for an altitude of a mobile device of said plurality of mobile devices.

10. The method according to claim 1, said method further comprising:
    transmitting a first report message containing said first probe signal parameter and said one or more further probe signal parameters.

11. The method according to claim 1, wherein a weighted graph is obtained as a result of the determining one or more relative positions between two or more mobile devices of said plurality of mobile devices.

12. The method according to claim 1, wherein at least one of said first probe signal parameters and said one or more further probe signal parameters is a received signal strength parameter, or a path-loss parameter, or a round trip time parameter, or a propagation delay parameter, or a combination thereof.

13. An apparatus comprising at least one processor and at least one memory including computer program code for one or more programs, said at least one memory and said computer program code configured to, with said at least one processor, cause said apparatus to:
    determine a first probe signal parameter that is indicative for a distance between a first mobile device of a plurality of devices and a second mobile device of said plurality of devices;
    obtain one or more further probe signal parameters, wherein each of said one or more further probe signal parameters is indicative for a distance between two mobile devices of said plurality of mobile devices;
    select probe signal parameters of said first probe signal parameter and said further probe signal parameters for determining one or more relative positions between two or more mobile devices of said plurality of mobile devices; and
    determine one or more relative positions between two or more mobile devices of said plurality of mobile devices at least based on said selected probe signal parameters of said first probe signal parameter and said one or more further probe signal parameters.

14. The apparatus according to claim 13, said at least one memory and said computer program code further configured to, with said at least one processor, cause said apparatus to:
    receive at least one first probe signal transmitted by said second mobile device, wherein said first probe signal parameter is determined based on said received at least one first probe signal.

15. The apparatus according to claim 13, wherein, if said first probe signal parameter and said one or more further probe signal parameter contain colliding probe signal parameters that are indicative for a distance between two mobile devices of said plurality of mobile devices, said selecting comprises:
    selecting one of said colliding probe signal parameters for determining a relative position between said two mobile devices at least based on a motion activity parameter that is associated with a motion activity of one of said two mobile devices, or a time stamp parameter that is associated with one of said colliding probe signal parameters, or a combination thereof.

16. The apparatus according to claim 15, wherein said selecting one of said colliding probe signal parameters comprises at least one of:
    determining whether a difference between time stamp parameters that are associated with said colliding probe signal parameters is greater than or equal to or less than a time threshold value, or
    determining whether a value represented by one of said colliding probe signal parameters is greater than or equal to or less than a value represented by another one of said colliding probe signal parameters.

17. The apparatus according to claim 16, wherein said time threshold value is determined at least based on a motion activity parameter that is indicative for a motion activity of one of said two mobile devices.

18. The apparatus according to claim 13, said at least one memory and said computer program code further configured to, with said at least one processor, cause said apparatus to:
    determine a first motion activity parameter that is associated with a motion activity of said first mobile device, or a first time stamp parameter that is associated with said first probe signal parameter, or a combination thereof; and
    obtain one or more further motion activity parameters, or one or more further time stamp parameters, or a combination thereof.

19. The apparatus according to claim 18, wherein said selected probe signal parameters of said first probe signal parameter and said one or more further probe signal parameters are selected at least partially based on said first motion activity parameter, said first time stamp parameter, said one or more further motion activity parameters, and said one or more further time stamp parameters.

20. The apparatus according to claim 18, wherein said one or more further probe signal parameters, or said one or more further motion activity parameters, or said one or more further time stamp parameters, or a combination thereof are at least partially obtained by receiving one or more report messages.

21. The apparatus according to claim 13, wherein said determining one or more relative positions between two or more mobile devices of said plurality of mobile devices is further at least based on a first altitude parameter that is indicative for an altitude of said first mobile device and/or one or more further altitude parameters, wherein each of said one or more further altitude parameters is indicative for an altitude of a mobile device of said plurality of mobile devices.

22. The apparatus according to claim 13, said at least one memory and said computer program code further configured to, with said at least one processor, cause said apparatus to:
transmit a first report message containing said first probe signal parameter and said one or more further probe signal parameters.

23. The apparatus according to claim 13, wherein a weighted graph is obtained as a result of the determining one or more relative positions between two or more mobile devices of said plurality of mobile devices.

24. The apparatus according to claim 13, wherein at least one of said first probe signal parameters and said one or more further probe signal parameters is a received signal strength parameter, or a path-loss parameter, or a round trip time parameter, or a propagation delay parameter, or a combination thereof.

25. The apparatus according to claim 13, wherein said apparatus is or is part of said first mobile device.

26. A system comprising a plurality of mobile devices, each of said mobile devices comprising at least one processor and at least one memory including computer program code for one or more programs, the at least one memory and the computer program code configured to, with the at least one processor, cause the respective mobile device to:
determine a first probe signal parameter that is indicative for a distance between the respective mobile device of the plurality of devices and a second mobile device of said plurality of devices;
obtain one or more further probe signal parameters, wherein each of said one or more further probe signal parameters is indicative for a distance between two mobile devices of said plurality of mobile devices;
select probe signal parameters of said first probe signal parameter and said further probe signal parameters for determining one or more relative positions between two or more mobile devices of said plurality of mobile devices; and
determine one or more relative positions between two or more mobile devices of said plurality of mobile devices at least based on said selected probe signal parameters of said first probe signal parameter and said one or more further probe signal parameters.

* * * * *